US010664370B2

(12) United States Patent
Shiozawa et al.

(10) Patent No.: US 10,664,370 B2
(45) Date of Patent: May 26, 2020

(54) MULTIPLE CORE ANALYSIS MODE FOR DEFECT ANALYSIS

(71) Applicant: RENESAS ELECTRONICS CORPORATION, Tokyo (JP)

(72) Inventors: Kenji Shiozawa, Ibaraki (JP); Yoshihide Nakamura, Ibaraki (JP); Takuya Lee, Tokyo (JP); Yutaka Nakadai, Tokyo (JP); Tetsuya Kokubun, Tokyo (JP); Hiroyuki Sasaki, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 223 days.

(21) Appl. No.: 15/969,273

(22) Filed: May 2, 2018

(65) Prior Publication Data

US 2019/0004914 A1 Jan. 3, 2019

(30) Foreign Application Priority Data

Jun. 28, 2017 (JP) .................................. 2017-126170

(51) Int. Cl.
*G06F 11/22* (2006.01)
*G06F 11/16* (2006.01)

(52) U.S. Cl.
CPC ...... *G06F 11/2242* (2013.01); *G06F 11/1629* (2013.01)

(58) Field of Classification Search
CPC ............ G06F 11/1608; G06F 11/1629; G06F 11/1637; G06F 11/1641; G06F 11/2221; G06F 11/2226; G06F 11/2236; G06F 11/242; G06F 11/27; G01R 31/31703; G01R 31/31724; G01R 31/3187
See application file for complete search history.

(56) References Cited

U.S. PATENT DOCUMENTS 5,530,804 A * 6/1996 Edgington .......... G06F 11/2236
  703/28
6,279,119 B1 * 8/2001 Bissett ................ G06F 11/1633
  703/23

(Continued)

FOREIGN PATENT DOCUMENTS

JP 2010-176392 A 8/2010

*Primary Examiner* — Gabriel Chu
(74) *Attorney, Agent, or Firm* — McDermott Will & Emery LLP

(57) ABSTRACT

Related semiconductor devices have a problem in which analysis processing with high defect reproducibility cannot be performed. According to an embodiment, a semiconductor device includes a first arithmetic core that executes a first program stored in a first code area using a first local memory area and a second arithmetic core that executes a second program stored in a second code area using a second local memory area. In an analysis mode, the semiconductor device performs first analysis processing that causes both the first arithmetic core and the second arithmetic core to execute the first program and second analysis processing that causes both the first arithmetic core and the second arithmetic core to execute the second program, and compares a plurality of arithmetic result data pieces acquired from the first and second analysis processing to thereby acquire analysis information used for defect analysis.

12 Claims, 19 Drawing Sheets

(56) References Cited

U.S. PATENT DOCUMENTS

| | | | | |
|---|---|---|---|---|
| 6,615,366 B1* | 9/2003 | Grochowski | ....... | G06F 9/30076 |
| | | | | 712/1 |
| 6,640,313 B1* | 10/2003 | Quach | ................. | G06F 11/1641 |
| | | | | 712/1 |
| 8,010,846 B1* | 8/2011 | Birkedahl | ............. | G06F 9/4881 |
| | | | | 714/11 |
| 8,219,796 B2* | 7/2012 | Weiberle | ............ | G06F 9/30185 |
| | | | | 709/208 |
| 8,423,829 B2 | 4/2013 | Yamagata et al. | | |
| 8,826,288 B2* | 9/2014 | Barr | ...................... | G06F 9/5044 |
| | | | | 718/104 |
| 2005/0240793 A1* | 10/2005 | Safford | ............... | G06F 9/30076 |
| | | | | 714/1 |
| 2006/0107117 A1* | 5/2006 | Michaelis | ........... | G06F 11/1658 |
| | | | | 714/25 |
| 2007/0088979 A1* | 4/2007 | Pomaranski | ........ | G06F 11/1641 |
| | | | | 714/10 |
| 2011/0179308 A1* | 7/2011 | Pathirane | ............ | G06F 9/30189 |
| | | | | 714/37 |
| 2011/0179309 A1* | 7/2011 | Pathirane | ............ | G06F 11/3648 |
| | | | | 714/37 |
| 2019/0004914 A1* | 1/2019 | Shiozawa | ........... | G06F 11/2236 |

* cited by examiner

MULTIPLE CORE ANALYSIS MODE FOR DEFECT ANALYSIS

CROSS-REFERENCE TO RELATED APPLICATIONS

This application is based upon and claims the benefit of priority from Japanese patent application No. 2017-126170, filed on Jun. 28, 2017, the disclosure of which is incorporated herein in its entirety by reference.

BACKGROUND

The present disclosure relates to a semiconductor device. For example, the present disclosure relates to a semiconductor device including a plurality of CPU cores provided on one semiconductor chip.

A semiconductor device performs a final test for confirming that a product meets the specifications on all the products before shipment from the factory. However, even the products that passed this final test may have a defect found during a customer process. The defective products that pass another final test and found to be defective at customers are referred to as test escapes. The test escape that passes the final test but found to be defective is after all a defective product. It is thus necessary to incorporate a test process for detecting defects into the final test in order to prevent such products from being distributed in the market. To this end, the defect events occurring in the test escapes need to be analyzed. Japanese Unexamined Patent Application Publication No. 2010-176392 discloses an example of such an analysis method.

In the technique described in Japanese Unexamined Patent Application Publication No. 2010-176392, a debugger operates on a host PC, and two microprocessors A and B execute the same debugging operation via debug I/F devices A and B in parallel in accordance with an operation of the debugger. Then, internal information (dump result) acquired from the microprocessors A and B is transferred to the host PC, and the host PC 120 compares the internal information acquired from the microprocessors A and B to analyze the failure.

SUMMARY

However, the technique described in Japanese Unexamined Patent Application Publication No. 2010-176392 has a problem that the environment used for the debug processing differs from the environment used for the test escape. For example, in the technique described in Japanese Unexamined Patent Application Publication No. 2010-176392, there are differences in operating environments such that non-defective samples and test escapes are connected to the host PC via the I/F devices, and thus the actual operation speed of the test escapes cannot be reproduced, and a program that actually generated a defect in the test escape cannot be obtained. That is, the technique described in Japanese Unexamined Patent Application Publication No. 2010-176392 has a problem of poor reproducibility of defects.

Other problems of the related art and new features of the present disclosure will become apparent from the following descriptions of the specification and attached drawings.

According to an example aspect, a semiconductor device includes a first arithmetic core that executes a first program stored in a first code area using a first local memory area and a second arithmetic core that executes a second program stored in a second code area using a second local memory area. In an analysis mode, the semiconductor device performs first analysis processing that causes both the first arithmetic core and the second arithmetic core to execute the first program and second analysis processing that causes both the first arithmetic core and the second arithmetic core to execute the second program, and compares a plurality of arithmetic result data pieces acquired from the first and second analysis processing to thereby acquire analysis information used for defect analysis.

According to the above example aspect, analysis processing with high defect reproducibility can be performed.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
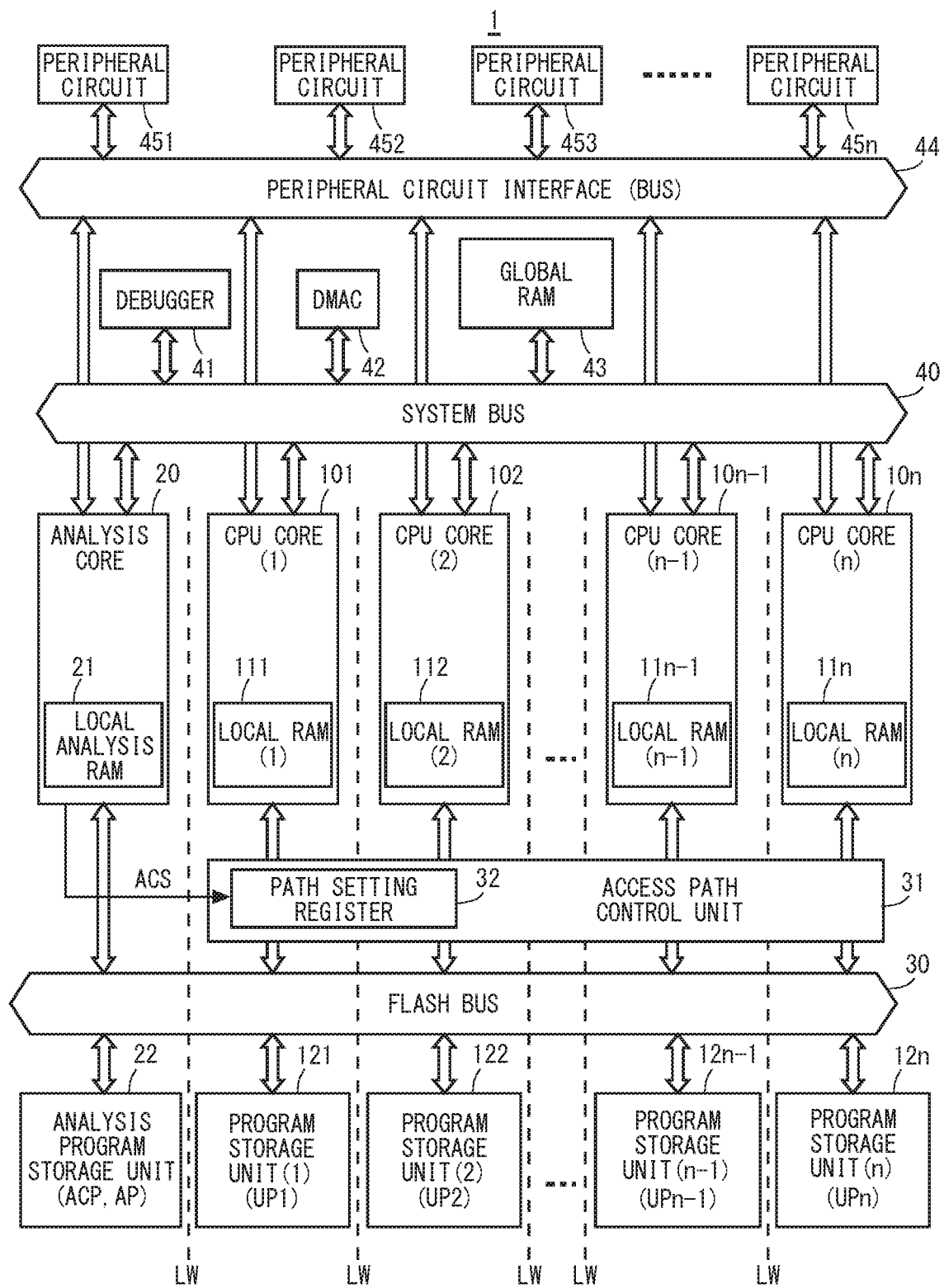
FIG. 1 is a block diagram of a semiconductor device according to a first embodiment.

For the clarification of the description, the following description and the drawings may be omitted or simplified as appropriate. Further, each element shown in the drawings as functional blocks that perform various processing can be formed of a CPU, a memory, and other circuits in hardware and may be implemented by programs loaded into the memory in software. Those skilled in the art will therefore understand that these functional blocks may be implemented in various ways by only hardware, only software, or the combination thereof without any limitation. Throughout the drawings, the same components are denoted by the same reference signs and overlapping descriptions will be omitted as appropriate.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

First Embodiment

FIG. 1 shows a block diagram of a semiconductor device 1 according to the first embodiment. The semiconductor device 1 according to the first embodiment includes a plurality of CPU cores each capable of independently executing a program. The semiconductor device 1 according to the first embodiment has an analysis mode and a debugging mode in addition to a normal operation mode in which a plurality of CPU cores independently execute the programs stored in the memories occupied by the respective CPU cores.

In the analysis mode, the CPU cores are permitted to access the memory areas of other CPU cores that cannot be accessed in the normal operation mode so that the CPU cores and the other CPU cores can execute the program stored in one of the memory areas.

In the debugging mode, a core analysis program not used in the normal operation mode is executed by the CPU core. This core analysis program is stored in a memory area that is inaccessible from the CPU core in the normal operation mode.

The semiconductor device 1 according to the first embodiment will be described in detail below. As shown in FIG. 1, the semiconductor device 1 according to the first embodiment includes CPU cores 101 to 10$n$ (n is an integer indicating the number of CPU cores), local RAMs 111 to 11$n$, program storage units 121 to 12$n$, an analysis core 20, a local analysis RAM 21, an analysis program storage unit 22, a flash bus 30, an access path control unit 31, a system bus 40, a debugger 41, a DMAC (Direct Memory Access Controller) 42, a global RAM 43, a peripheral circuit interface 44, and peripheral circuits 451 to 45$n$.

In the following description, a first arithmetic core is one of the CPU cores 101 to 10$n$, and a second arithmetic core is another one of the CPU cores 101 to 10$n$. For example, a case where the CPU core 101 is used as the first arithmetic core, and the CPU core 102 is used as the second arithmetic core is described below.

A first local memory area is a local memory area provided so as to correspond to the first arithmetic core. When the first arithmetic core is the CPU core 101, the first local memory area is the local RAM 111. A second local memory area is a local memory area provided so as to correspond to the second arithmetic core. When the second arithmetic core is the CPU core 102, the second local memory area is the local RAM 112.

A first code area is a code area provided so as to correspond to the first arithmetic core. When the first arithmetic core is the CPU core 101, the first code area is the program storage unit 121. A second code area is a code area provided so as to correspond to the second arithmetic core. When the second arithmetic core is the CPU core 102, the second code area is the program storage unit 122.

A first program is a program stored in the first code area provided so as to correspond to the first arithmetic core. When the first arithmetic core is the CPU core 101, the first program is a user program UP1 stored in the program storage unit 121. A second program is a program stored in the second code area provided so as to correspond to the second arithmetic core. When the second arithmetic core is the CPU core 102, the second program is a user program UP2 stored in the program storage unit 122.

The CPU cores 101 to 10$n$ are arithmetic cores that execute programs. The CPU cores 101 to 10$n$ execute the programs stored in the program storage units 121 to 12$n$ using the local RAMs 111 to 11$n$ provided as occupied memory areas for the CPU cores, respectively. Specifically, when the CPU core 101 is the first arithmetic core, the CPU core 101 executes the first program (e.g., the user program UP1) stored in the first code area (e.g., the program storage unit 121) using the first local memory area (e.g., the local RAM 111). When the CPU core 102 is the second arithmetic core, the CPU core 102 executes the second program (e.g., the user program UP2) stored in the second code area (e.g., the program storage unit 122) using the second local memory area (e.g., the local RAM 112).

The analysis core 20 reads out and executes an analysis control program ACP stored in an analysis code area (e.g., the analysis program storage unit 22). The local analysis RAM 21 is a memory area occupied by the analysis core 20 and holds an execution result of the analysis control program executed by the analysis core 20. In the first embodiment, the analysis program storage unit 22 stores a core analysis program AP in addition to the analysis control program ACP.

The analysis core 20 remains in a stopped state where no program is executed in the normal operation mode. In the analysis mode and the debugging mode, the analysis core 20 executes the analysis control program ACP in accordance with an operation start command (e.g., an analysis mode start command and a debugging mode start command) provided from the debugger 41 to control states of program execution in the CPU cores 101 to 10*n*.

In the analysis mode, the analysis core 20 specifies a program to be executed on the CPU core to be analyzed, and collects arithmetic result data generated by the execution of the program on the CPU core to be analyzed. Then, the analysis core 20 generates analysis information used for defect analysis from information on a difference in the collected arithmetic result data.

As a specific example, in first analysis processing performed during the operation in the analysis mode, the analysis core 20 compares first arithmetic result data AD1 generated by the CPU core 101 based on the user program UP1 with second arithmetic result data AD2 generated by the CPU core 102 based on the user program UP1. In second analysis processing performed during the operation in the analysis mode, the analysis core 20 compares third arithmetic result data AD1 generated by the CPU core 101 based on the user program UP2 with fourth arithmetic result data AD2 generated by the CPU core 102 based on the user program UP2. Then, the analysis core 20 uses the first to fourth arithmetic result data acquired by the first analysis processing and the second analysis processing to generate analysis information used for defect analysis of the CPU cores 101 and 102 and circuits used by the CPU cores 101 and 102.

In the debugging mode, the analysis core 20 causes at least one of the CPU cores 101 to 10*n* to execute the core analysis program AP. Then, the analysis core 20 generates the analysis information based on fifth arithmetic result data generated based on the core analysis program AP.

The flash bus 30 is a data transmission/reception path between the CPU cores 101 to 10*n* and the analysis core 20 and the program storage units 121 to 12*n* and the analysis program storage unit 22. The flash bus 30 controls the path of data to be transmitted and received. Specifically, the flash bus 30 transmits and receives data between a program storage area specified as an access destination and a core of an access request source. The program storage area is specified as the access destination based on an address signal and an access control signal output from the CPU cores 101 to 10*n* and the analysis core 20.

Further, the flash bus 30 forms a logical barrier LW based on identifiers of the CPU cores included in address signals and access control signals output from the CPU cores 101 to 10*n*. The flash bus 30 prohibits one CPU core from accessing an area other than the program area allocated to the one CPU core based on the logical barrier LW. Thus, in the semiconductor device 1 according to the first embodiment, while the access path control unit 31, which will be described later, is operating based on the setting value for the normal operation mode, the CPU core 101 is permitted to access only the program storage unit 121, and the CPU core 102 is permitted to access only the program storage unit 122.

In the normal operation mode in which the CPU cores 101 to 10*n* operate independently, the access path control unit 31 prevents the first arithmetic core (e.g., the CPU core 101) from accessing the second code area (e.g., the program storage unit 122) and the second arithmetic core (e.g., the CPU core 102) from accessing the first code area (e.g., the program storage unit 121). Specifically, the access path control unit 31 controls the above-described normal operation mode by transmitting the address signals and the access control signals output from the CPU cores 101 to 10*n* as they are to the flash bus 30.

On the other hand, in the analysis mode or the debugging mode, the access path control unit 31 replaces the address signals and the access control signals so that the CPU cores 101 to 10*n* can access the memory areas in a range exceeding the logical barrier LW formed by the flash bus 30. Specifically, in the analysis mode or the debugging mode, the access path control unit 31 replaces identifiers included in the address signals and the access control signals output from the respective CPU cores by identifiers of the CPU cores that can access the program areas of access destinations. Then, the flash bus 30 permits only the CPU core having the same identifier as the replaced identifier to access the program area, which has been permitted for access, based on the replaced identifier.

As a specific example, in the analysis mode, the access path control unit 31 switches the access path so that the user program UP1 is read into the CPU cores 101 and 102 in accordance with a command from the analysis core 20 in the first analysis processing and switches the access path so that the user program UP2 is read into the CPU cores 101 and 102 in the second analysis processing.

As another specific example, in the debugging mode, the access path control unit 31 switches the access path so that the CPU cores 101 and 102 can access the analysis program storage unit 22 that stores the core analysis program.

The access path control unit 31 includes a path setting register 32, and switches the access path as described above based on a path setting value ACS stored in the path setting register 32. The path setting value ACS is rewritten by the analysis core 20 executing the analysis control program ACP. The analysis core 20 determines the path setting value ACS based on the control parameters included in the operation start command provided from the debugger 41.

The system bus 40 controls transmission and reception of data, operation commands, and the like between the CPU cores 101 to 10*n* and the analysis core 20, the debugger 41, the DMAC 42, and the global RAM 43. The debugger 41 instructs the analysis core 20 to start an operation based on the analysis control program ACP. At this time, the debugger 41 provides the control parameter indicating whether the analysis core 20 operates in the analysis mode or the debugging mode to the analysis core 20 by the analysis control program ACP. The control parameter includes a value for specifying a CPU core that executes a program in each mode and a value for specifying a program storage area that stores a program to be executed by the CPU core.

The control parameter provided to the analysis core 20 by the debugger 41 is provided to the debugger 41 from a host computer connected to the semiconductor device 1. The semiconductor device 1 may not include the debugger 41 therein and instead the external host computer may include the function of the debugger 41.

The DMAC 42 is one of the peripheral circuits. The DMAC 42 controls data transfer between the global RAM 43 or a memory provided as one of the peripheral circuits 451 to 45*n* and the CPU cores 101 to 10*n*. The global RAM 43 is a global memory area that is one of the peripheral circuits. The global RAM 43 can be accessed from any of the arithmetic cores of the CPU cores 101 to 10*n* and the analysis core 20.

The peripheral circuit interface 44 controls transmission and reception of data, operation commands, and the like between the CPU cores 101 to 10n and the analysis core 20 and the peripheral circuits 451 to 45n. The peripheral circuits 451 to 45n are circuits that serve specific functions in accordance with the operation commands provided from the CPU cores 101 to 10n and the analysis core 20. As the peripheral circuits 451 to 45n, there may be circuits such as a timer, an analog/digital conversion circuit, a coprocessor, a memory, a direct memory access controller, a PWM (Pulse Width Modulation) signal generation circuit, a communication interface circuit, and an input and output interface circuit.

Further, in the semiconductor device 1 according to the first embodiment, the CPU cores 101 to 10n perform operations using at least one of the DMAC 42, the global RAM 43, and the peripheral circuits 451 to 45n while executing the user programs UP1 to UPn.

Next, an operation of the semiconductor device 1 according to the first embodiment will be described. In the following description, although the operation of the CPU cores 101 and 102 will be described, the other CPU cores can operate in the same manner as that of the CPU cores 101 and 102.

First, in the semiconductor device 1 according to the first embodiment, in the normal operation mode, each CPU core operates in a memory space limited by the logical barrier LW. Specifically, in the normal operation mode, the CPU core 101 executes the user program UP1 stored in the program storage unit 121 using the local RAM 111, and the CPU core 102 executes the user program UP2 stored in the program storage unit 122 using the local RAM 112. In this normal operation mode, the CPU core 101 is prevented from accessing the program storage units 122 to 12n and the analysis program storage unit 22 that are in the memory space separated by the logical barrier LW. The CPU core 102 is prevented from accessing the program storage unit 121, program storage units 123 (not shown) to 12n and the analysis program storage unit 22 that are in the memory space separated by the logical barrier LW. In this normal operation mode, the CPU cores 101 and 102 execute programs using peripheral circuits such as the peripheral circuits 451 to 45n.

Figure 2:
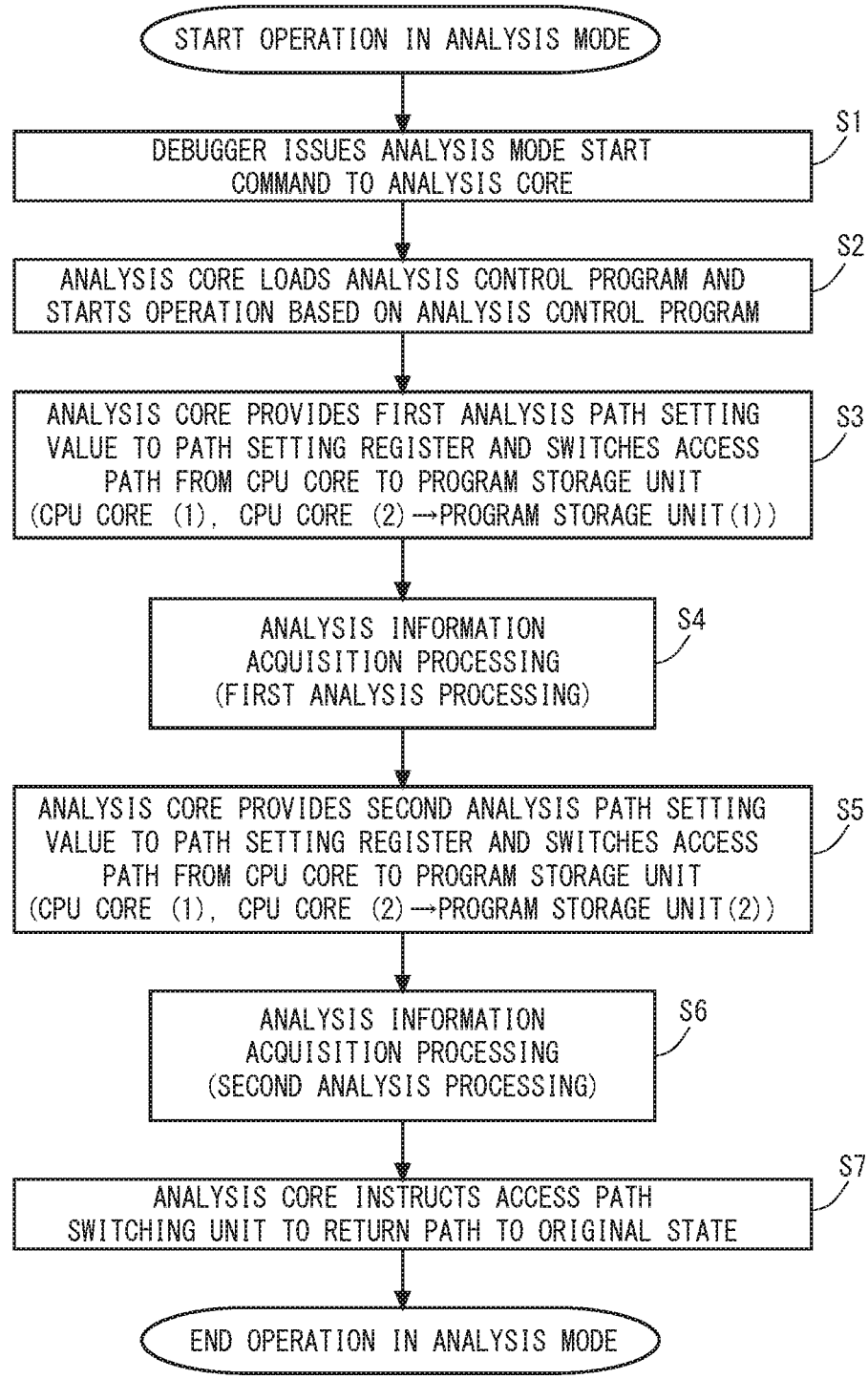
FIG. 2 is a flowchart for describing a processing flow of an analysis mode of the semiconductor device according to the first embodiment.

Next, an operation in the analysis mode and the debugging mode, which is one of the features of the semiconductor device 1 according to the first embodiment, will be described. FIG. 2 is a flowchart for describing a processing flow of the analysis mode of the semiconductor device according to the first embodiment. An example shown in FIG. 2 is for analyzing a defect occurring when CPU 101 executes the user program UP1. In this analysis, the two CPU cores 101 and 102 and the user programs UP1 and UP2 are used. The number of CPU cores and the number of the user programs used in the operation in the analysis mode are appropriately changed in accordance with the occurring defect. A plurality of combinations of the CPU core and the user program for the defect analysis are preferably used by changing the combination of the CPU core and the user program during one analysis processing, because this improves accuracy of the analysis.

As shown in FIG. 2, the semiconductor device 1 according to the first embodiment starts an operation when the debugger 41 issues the analysis mode start command to the analysis core 20 (Step S1). The analysis mode start command includes the control parameters specifying a plurality of CPU cores to be analyzed in the analysis mode and programs to be used in the analysis mode. The analysis mode start command further includes a start fetch address indicating a load start position of the analysis control program.

Next, the analysis core 20 loads the analysis control program ACP from the analysis program storage unit 22 in accordance with the analysis mode start command, and starts the operation based on the analysis control program (Step S2). Next, the analysis core 20 generates a first analysis path setting value ACS for setting access paths for the first analysis processing based on the control parameters included in the analysis mode start command. Then, the analysis core 20 provides the first analysis path setting value ACS to the access path control unit 31, and switches the access path from the CPU core to the program storage unit (Step S3).

Figure 3:
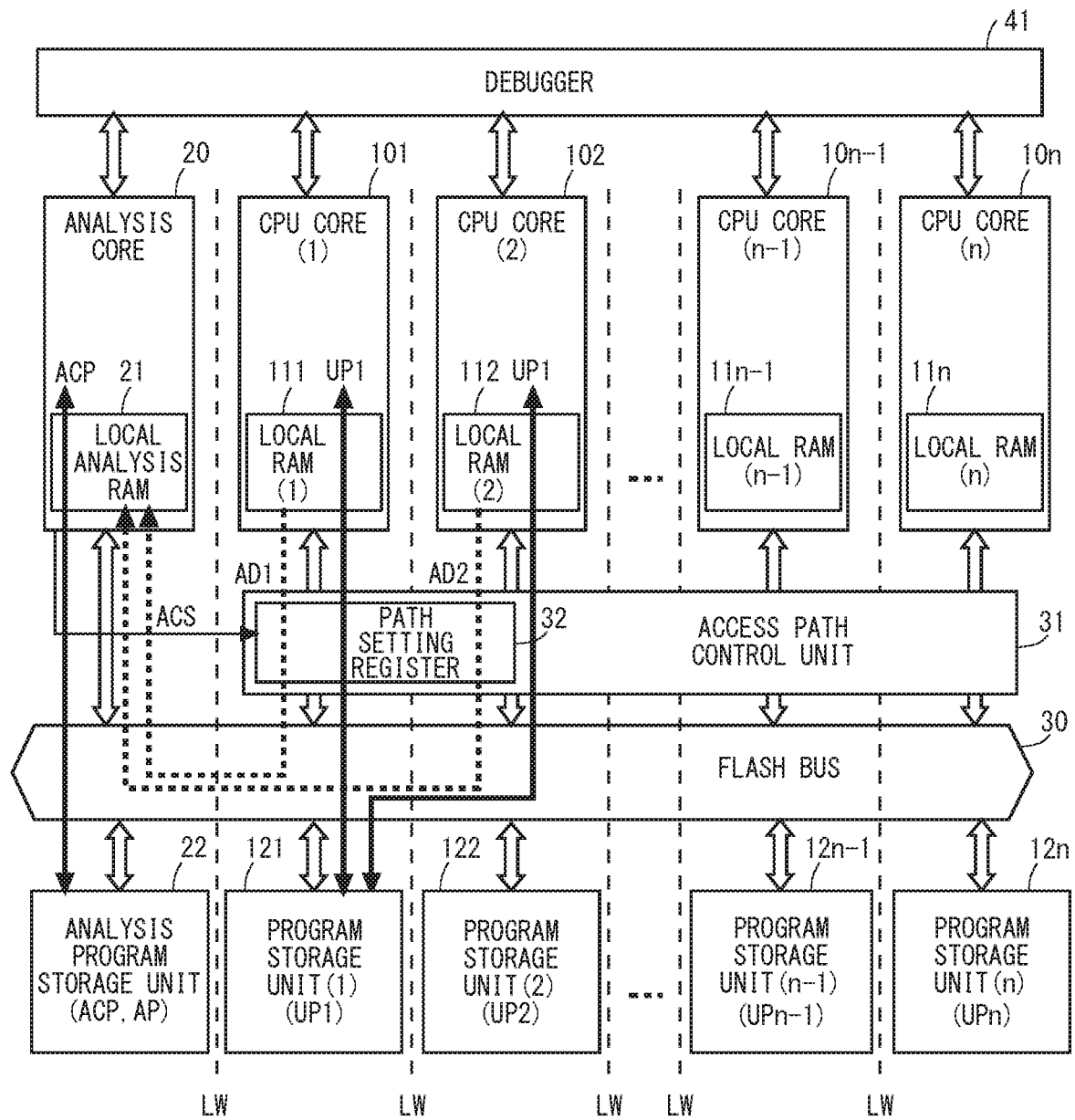
FIG. 3 is a diagram for describing read paths of programs and read paths of arithmetic results in first analysis processing of the analysis mode of the semiconductor device according to a first embodiment.

The access path formed in Step S3 will be described with reference to FIG. 3. FIG. 3 is a diagram for describing read paths of the programs and read paths of the arithmetic results in the first analysis processing of the analysis mode of the semiconductor device according to the first embodiment. As shown in FIG. 3, in the example shown in FIG. 2, the paths for accessing the program storage unit 121 by the CPU cores 101 and 102 are formed by the first analysis path setting value ACS. Then, both the CPU core 101 and the CPU core 102 load the user program UP2. Further, arithmetic results AD1 and AD2 generated in the processing of the next Step S4 are both transferred to the local analysis RAM 21 of the analysis core 20.

Next, the semiconductor device 1 according to the first embodiment performs analysis information acquisition processing as the first analysis processing (Step S4). In this first analysis processing, the analysis core 20 generates the analysis information based on the arithmetic results AD1 and AD2 acquired by both the CPU core 101 and the CPU core 102 executing the user program UP1. Details of this analysis information acquisition processing will be described later.

Next, the analysis core 20 generates a second analysis path setting value ACS for setting the access path for the second analysis processing based on the control parameters included in the analysis mode start command. Then, the analysis core 20 provides the second analysis path setting value ACS to the access path control unit 31, and switches the access path from the CPU core to the program storage unit (Step S5)

Figure 4:
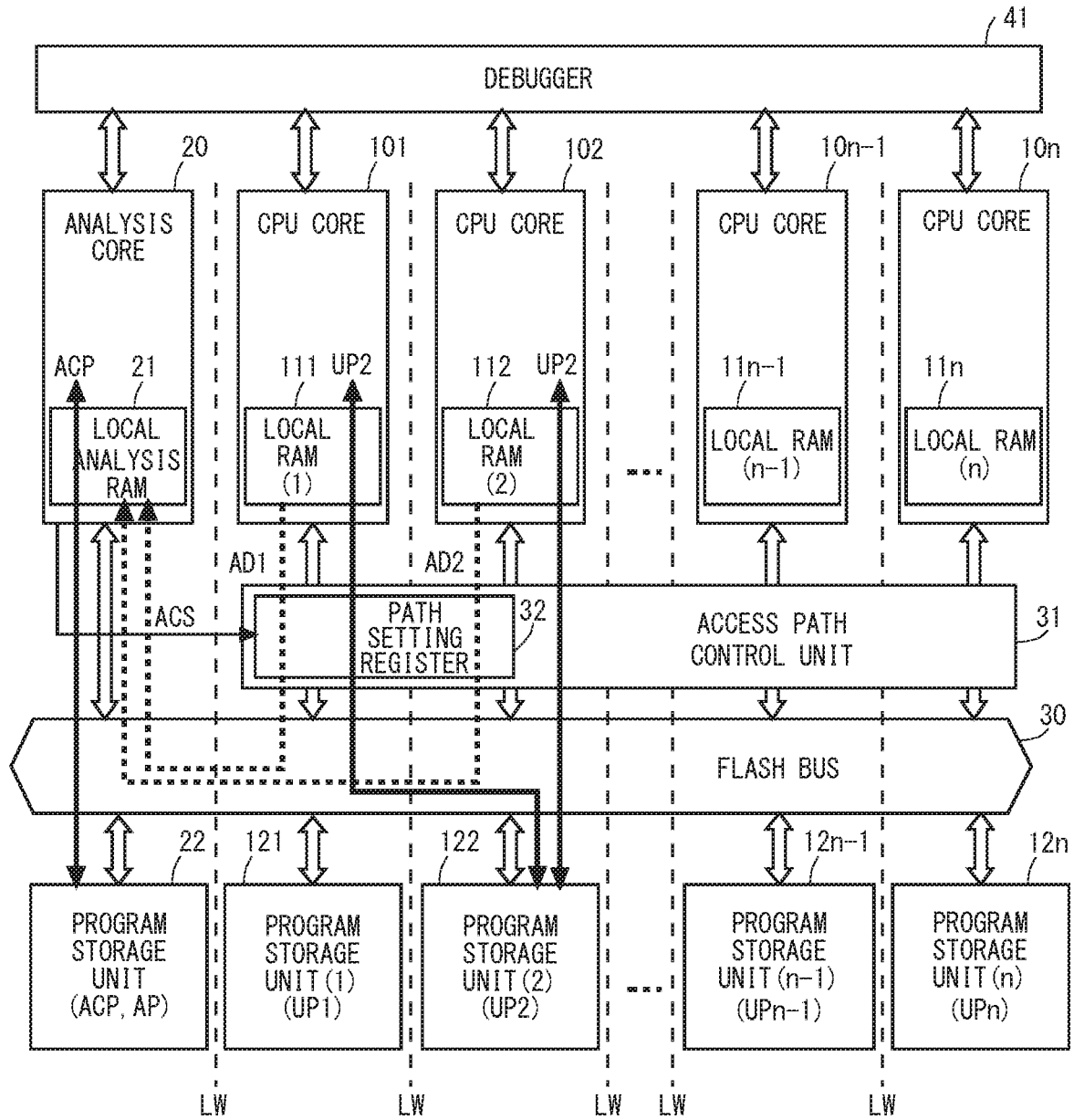
FIG. 4 is a diagram for describing read paths of programs and read paths of arithmetic results in second analysis processing of the analysis mode of the semiconductor device according to a first embodiment.
Figure 5:
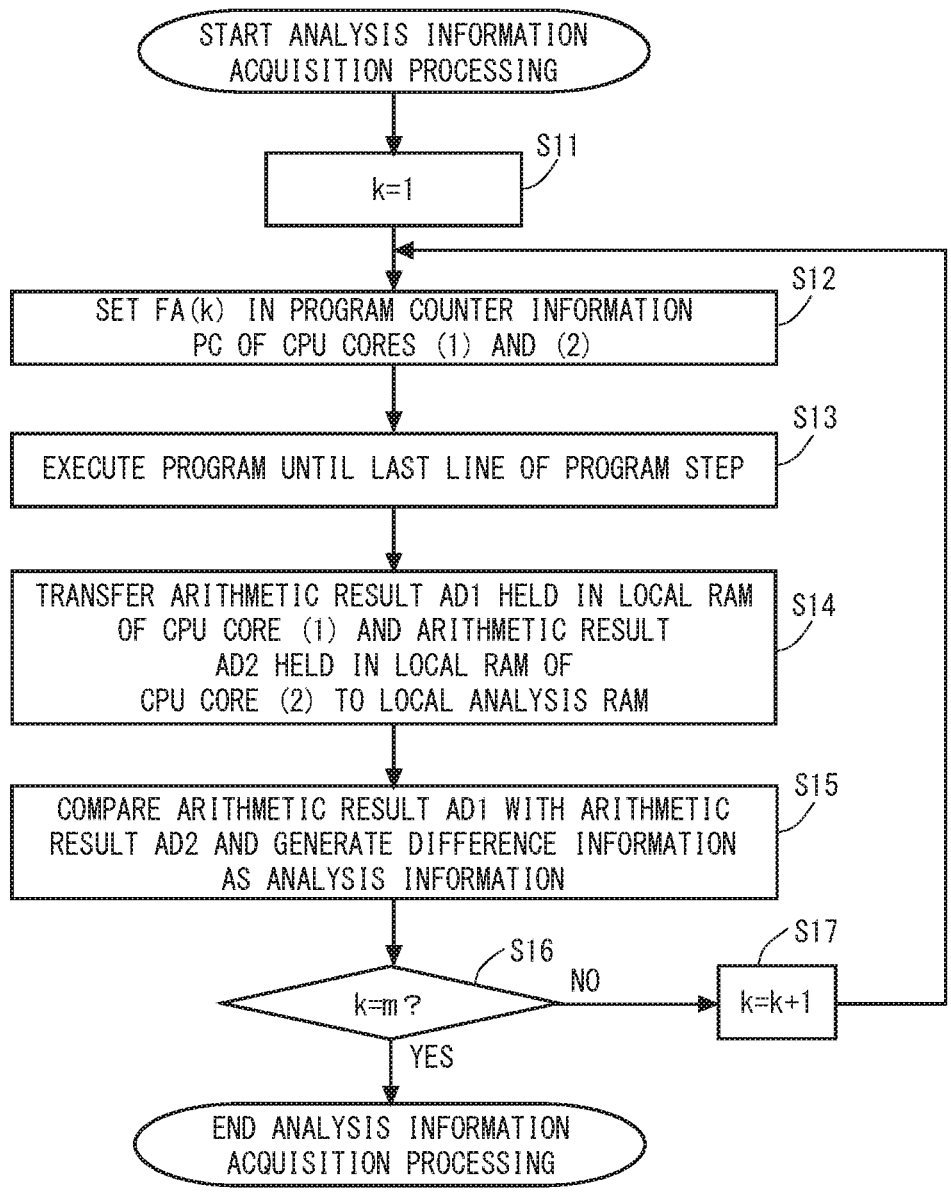
FIG. 5 is a flowchart for describing a processing flow of analysis information acquisition processing of the semiconductor device according to the first embodiment.

The access path formed in Step S5 will be described with reference to FIG. 4. FIG. 4 is a diagram for describing read paths of the programs and read paths of the arithmetic results in the second analysis processing of the analysis mode of the semiconductor device according to the first embodiment. As shown in FIG. 5, in the example shown in FIG. 2, the paths for the CPU cores 101 and 102 to access the program storage unit 122 are formed by the second analysis path setting value ACS. Then, both the CPU core 101 and the CPU core 102 load the user program UP2. Further, arithmetic results AD1 and AD2 generated in the processing of the next Step S6 are both transferred to the local analysis RAM 21 of the analysis core 20.

Next, the semiconductor device 1 according to the first embodiment performs analysis information acquisition processing as the second analysis processing (Step S6). In this second analysis processing, the analysis core 20 generates the analysis information based on the arithmetic results AD1 and AD2 acquired by both the CPU core 101 and the CPU core 102 executing the user program UP2. Details of this analysis information acquisition processing will be described later.

Next, the analysis core 20 resets the path setting value ACS to the state of the normal operation mode and ends the analysis mode (Step S7).

Next, the analysis information acquisition processing executed in Steps S4 and S6 in FIG. 2 will be described. The analysis information acquisition processing in Step S4 and the analysis information acquisition processing in Step S6 differ from each other only in the user program to be executed while the other operations are the same. Thus, only the analysis information acquisition processing in Step S4 will be described here.

FIG. 5 is a flowchart for describing a processing flow of the analysis information acquisition processing of the semiconductor device according to the first embodiment. As shown in FIG. 5, in the analysis information acquisition processing, firstly the analysis core 20 initializes the number k of the fetch address that specifies the program to be executed by the CPU cores 101 and 102 (Step S1). This fetch address is specified as one of the control parameters included in the analysis mode start command.

Next, the analysis core 20 sets a fetch address FA(k) in program counter information PC of the CPU cores 101 and 102 (Step S12). Thus, the CPU cores 101 and 102 start the processing of the program step specified by the fetch address FA(k). Then, the CPU cores 101 and 102 execute the program until the last line of the started program step (Step S13). By executing the program in Step S13, the arithmetic result AD1 is generated in the local RAM 111 of the CPU core 101 and the arithmetic result AD2 is generated in the local RAM 112 of the CPU core 102.

Next, the analysis core 20 transfers the arithmetic result AD1 held in the local RAM 111 of the CPU core 101 and the arithmetic result AD2 held in the local RAM 112 of the CPU core 102 to the analysis program storage unit 22 (Step S14). Next, the analysis core 20 extracts the information on a difference between the arithmetic results AD1 and AD2 held in the analysis program storage unit 22, and generates the difference information as the analysis information.

In the semiconductor device 1 according to the first embodiment, the processing from Step S12 to Step S15 is repeated until the number k of the fetch address reaches the final number m, while incrementing the number k of the fetch address one by one (Steps S16 and S17). Then, the analysis core 20 ends the analysis information acquisition processing when the generation processing of the analysis information based on the arithmetic results AD1 and AD2 acquired by executing the program step in which the number of the fetch address is m.

Figure 6:
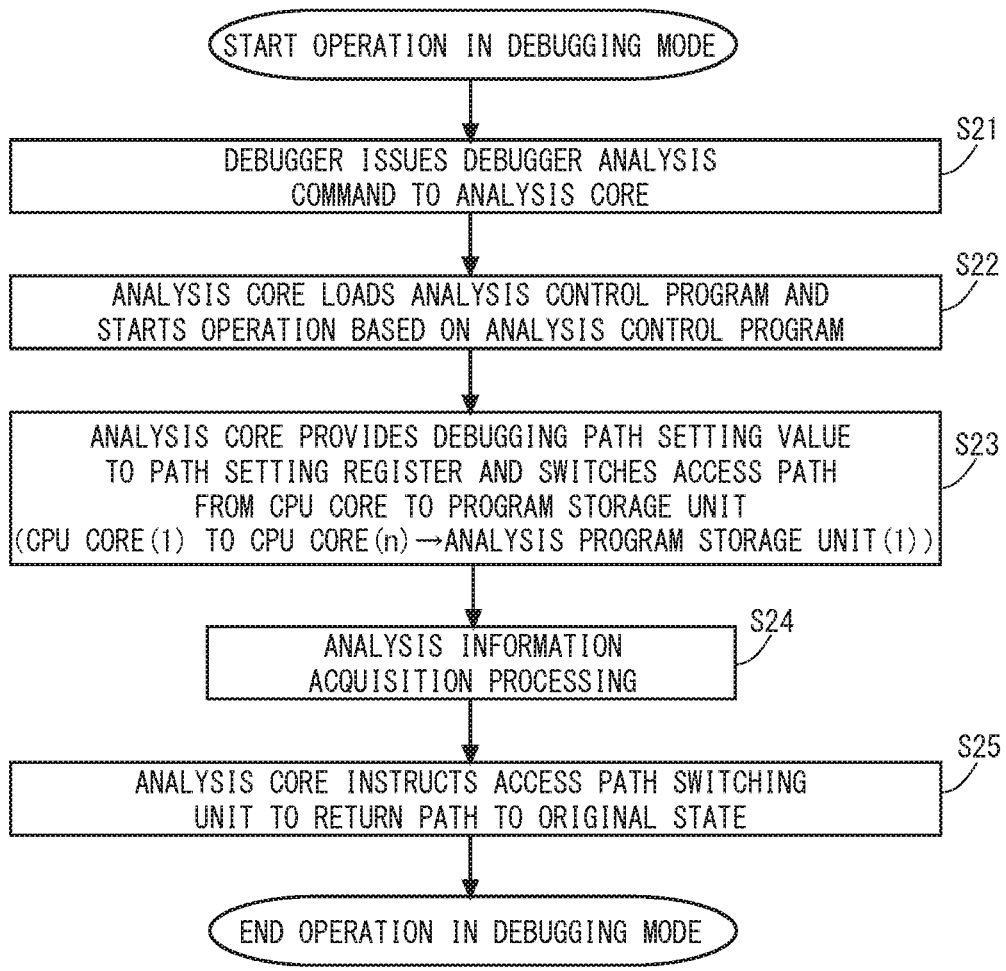
FIG. 6 is a flowchart for describing a processing flow of a debugging mode of the semiconductor device according to the first embodiment.

FIG. 6 is a flowchart for describing a processing flow of the debugging mode of the semiconductor device according to the first embodiment. In the example shown in FIG. 6, the core analysis program AP is executed by the CPU cores 101 to 10n in order to verify whether there is a defect in the core analysis program AP. The CPU core used for the operation in the debugging mode only needs to include a CPU core in which a defect is occurring by the execution of the user program. The number of CPU cores to be used is appropriately changed. It is also possible to analyze a defect occurring in the CPU core by the core analysis program AP using a program for inspecting a specific part that is considered to be defective as the core analysis program AP, although this is not described here.

As shown in FIG. 6, the semiconductor device 1 according to the first embodiment starts an operation when the debugger 41 issues the debugging mode start command to the analysis core 20 (Step S21). This debugging mode start command includes control parameters specifying a CPU core that executes the core analysis program AP and specifying the core analysis program AP. The debugging mode start command further includes a start fetch address indicating a load start position of the analysis control program.

Next, the analysis core 20 loads the analysis control program ACP from the analysis program storage unit 22 in accordance with the analysis mode start command, and starts the operation based on the analysis control program (Step S22). Next, the analysis core 20 generates a debugging path setting value ACS for setting access paths for the debugging processing based on the control parameters included in the debugging mode start command. Then, the analysis core 20 provides the debugging path setting value ACS to the access path control unit 31, and switches the access path so that access paths from the CPU core to the analysis program storage unit 22 is formed (Step S23).

Figure 7:
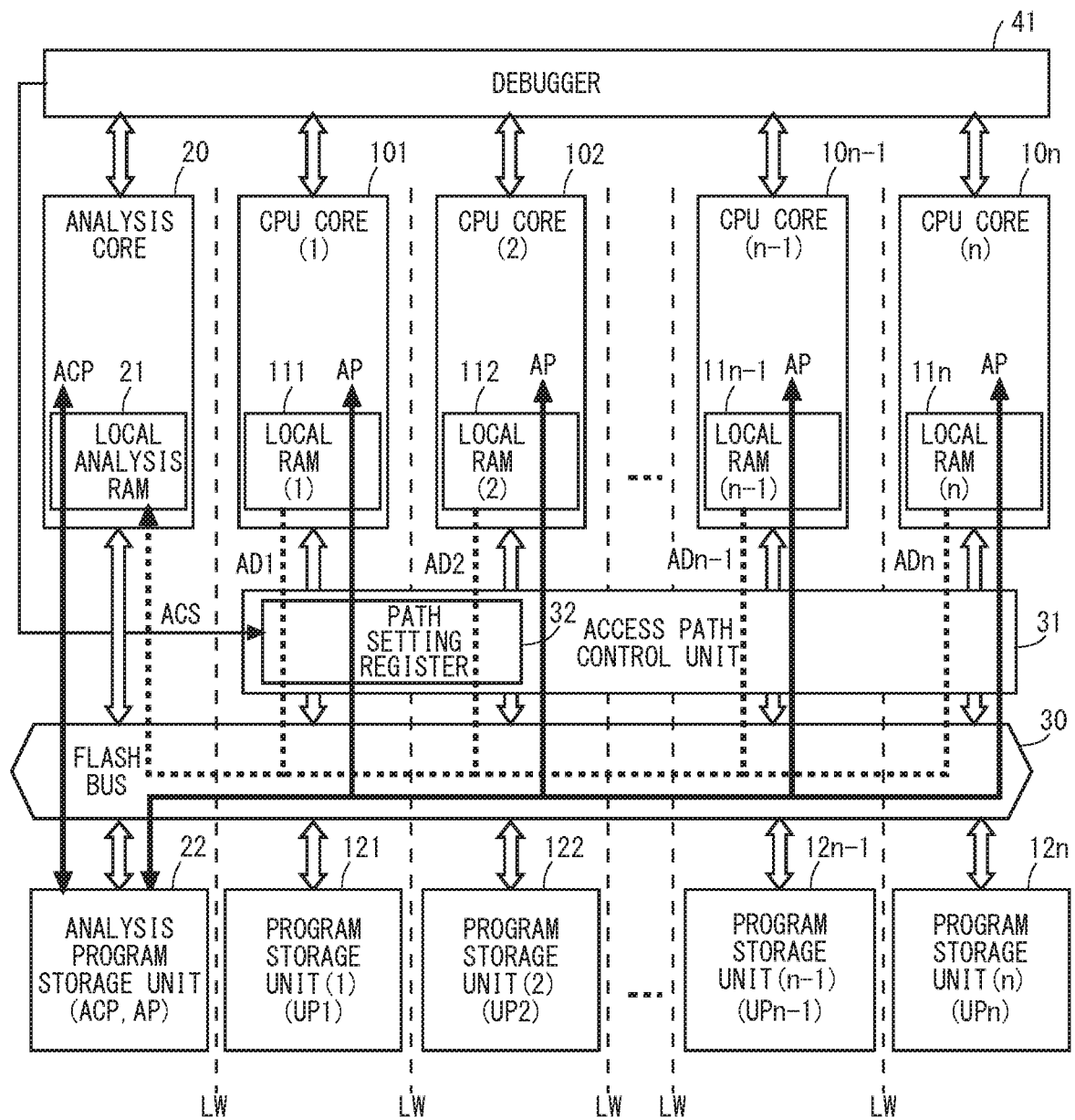
FIG. 7 is a diagram for describing read paths of programs and read paths of arithmetic results in a debugging mode of the semiconductor device according to the first embodiment.

The access path formed in Step S23 will be described with reference to FIG. 7. FIG. 7 is a diagram for describing read paths of the programs and read paths of the arithmetic results in the debugging mode of the semiconductor device according to the first embodiment. As shown in FIG. 7, in the example shown in FIG. 6, the paths for the CPU cores 101 to 10n to access the analysis program storage unit 22 are formed by the debugging analysis path setting value ACS. Then, the CPU cores 101 to 10n load the core analysis program AP. The arithmetic results AD1 to ADn generated in the processing of the next Step S24 are transferred to the local analysis RAM 21 of the analysis core 20.

Next, the semiconductor device 1 according to the first embodiment performs the analysis information acquisition processing (Step S24). In the analysis information acquisition processing, the analysis core 20 generates the analysis information based on the arithmetic results AD1 to ADn acquired by the CPU cores 101 to 10n executing the core analysis program AP. Details of this analysis information acquisition processing will be described later.

Next, when the analysis information acquisition processing is completed, the analysis core 20 resets the path setting value ACS to the state of the normal operation mode and ends the analysis mode (Step S25).

Next, the analysis information acquisition processing to be executed in Step S24 in FIG. 6 will be described. When a plurality of program steps are included in the core analysis program AP, there are two possible timings for acquiring the analysis information. Thus, in the following description, two analysis information acquisition processings' having different timing for acquiring the analysis information will be described.

Figure 8:
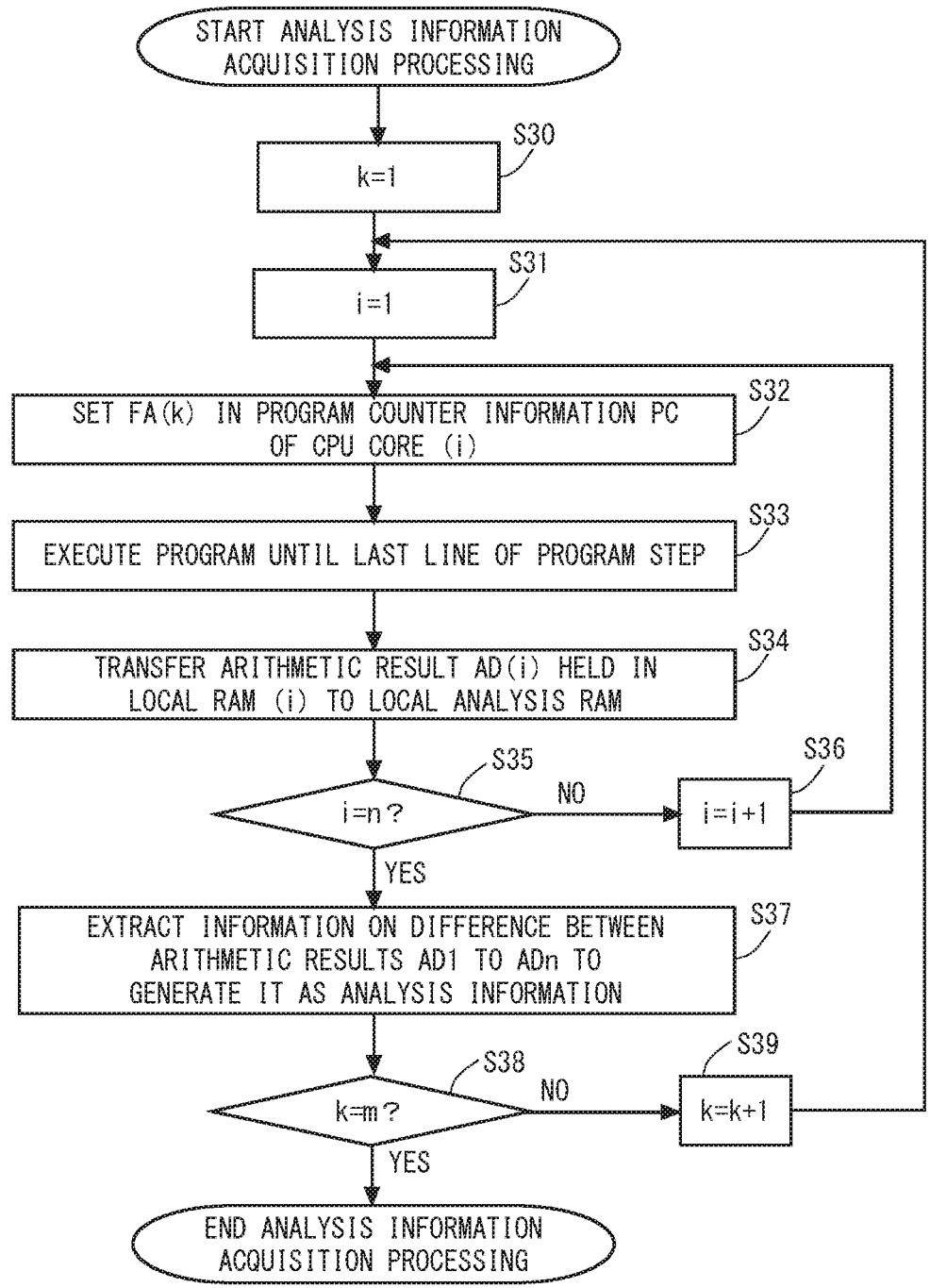
FIG. 8 is a flowchart for describing a first example of a processing flow of the analysis information acquisition processing of the semiconductor device according to the first embodiment.

FIG. 8 is a flowchart for describing a first example of the processing flow of the analysis information acquisition processing of the semiconductor device according to the first embodiment. In the first example, the analysis information is generated every time one program step ends. As shown in FIG. 8, in the first example of the analysis information acquisition processing, the analysis core 20 firstly initializes the number k of the fetch address specifying the program to be executed by the CPU core (Step S30). This fetch address is specified as one of the control parameters included in the analysis mode start command. Next, the analysis core 20 initializes the number i of the CPU core that executes the core analysis program AP (Step S31).

Next, the analysis core 20 sets the fetch address FA(k) in the program counter information PC of the CPU core (i) (Step S33). Thus, the CPU core (i) starts the processing of the program step specified by the fetch address FA(k). Then, the CPU core (i) executes the program until the last line of the started program step (Step S34). By executing the program in Step S34, the arithmetic result AD(i) is generated in the local RAM (i) of the CPU core (i).

Next, the analysis core 20 transfers the arithmetic result AD(i) held in the local RAM (i) of the CPU core (i) to the analysis program storage unit 22 (Step S35). Next, the analysis core 20 increments the number i of the CPU core that executes the core analysis program AP by one (Step S37). After that, the semiconductor device 1 according to the first embodiment repeats the processing from Step S33 to Step S36 until the number i of the CPU core reaches n (n is an integer indicating the number of CPU cores).

When all of the arithmetic results AD1 to ADn acquired by executing the program steps specified by the fetch address FA(k) in the CPU cores 101 to 10n (CPU cores (1) to (n) in FIG. 8) are acquired, the analysis core 20 generates the analysis information based on the arithmetic results AD1 to ADn.

After that, in the semiconductor device 1 according to the first embodiment, the processing from Step S31 to Step S37 is repeated until the number k of the fetch address reaches the final number m, while the number k of the fetch address is incremented one by one (Steps S38 and S39). Then, the analysis core 20 ends the analysis information acquisition processing upon completion of the generation of the analysis information based on the arithmetic results AD1 to ADn acquired by executing the program step in which the number of the fetch address is m.

Figure 9:
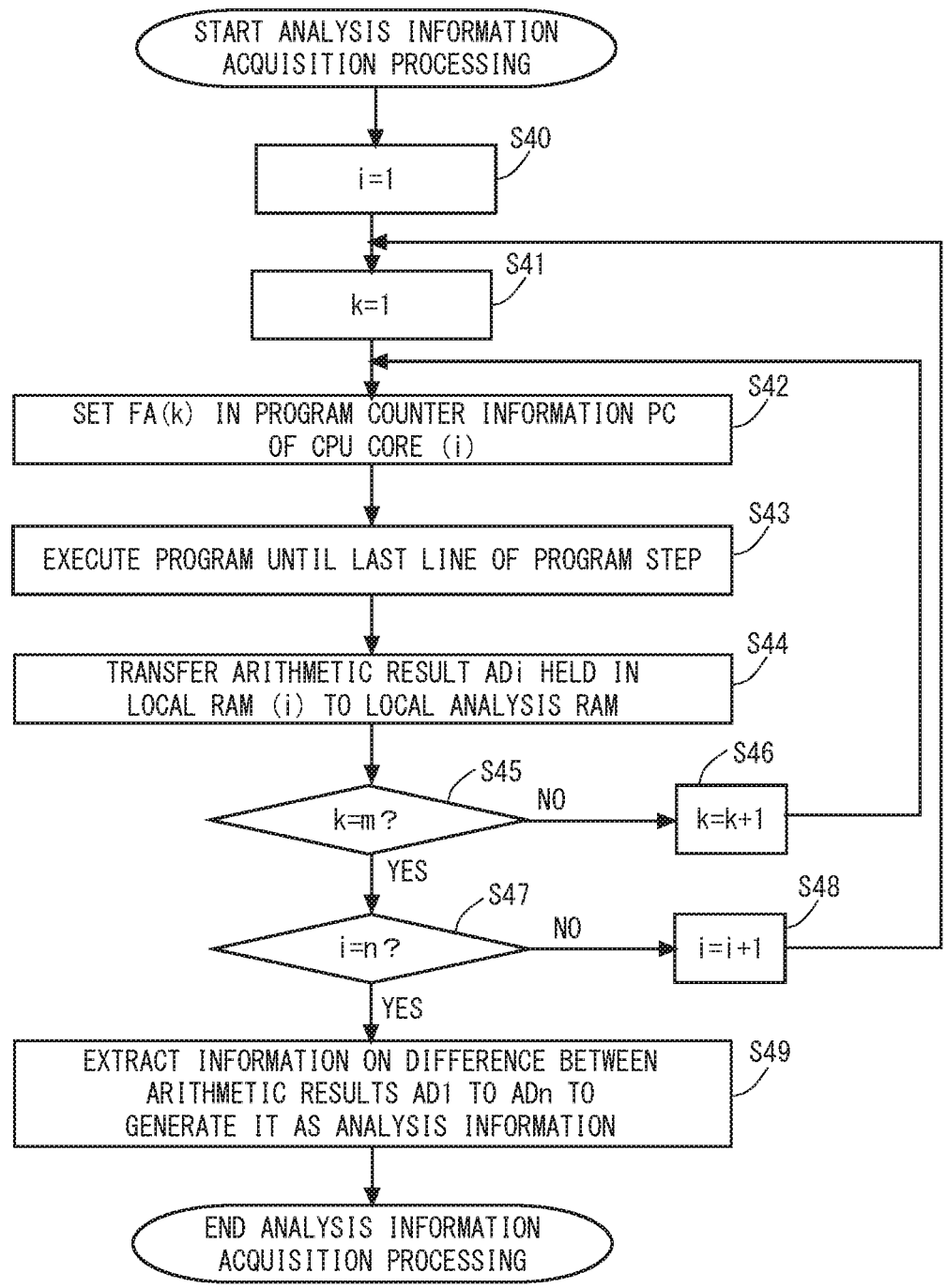
FIG. 9 is a flowchart for describing a second example of a processing flow of the analysis information acquisition processing of the semiconductor device according to the first embodiment.

FIG. 9 is a flowchart for describing a second example of the processing flow of the analysis information acquisition processing of the semiconductor device according to the first embodiment. In the second example, the analysis information is generated after all the program steps have been completed in all the CPU cores instructed to execute the core analysis program AP. As shown in FIG. 9, in the second example of the analysis information acquisition processing, the analysis core 20 firstly initializes the number i of the CPU core that executes the core analysis program AP (Step S40). Next, the analysis core 20 initializes the number k of the fetch address specifying the program to be executed by the CPU core (Step S41). This fetch address is specified as one of the control parameters included in the analysis mode start command.

Next, the analysis core 20 sets the fetch address FA(k) in the program counter information PC of the CPU core (i) (Step S42). Thus, the CPU core (i) starts the processing of the program step specified by the fetch address FA(k). Then, the CPU core (i) executes the program until the last line of the started program step (Step S43). By executing the program in Step S43, the arithmetic result AD(i) is generated in the local RAM (i) of the CPU core (i).

Next, the analysis core 20 transfers the arithmetic result AD(i) held in the local RAM (i) of the CPU core (i) to the analysis program storage unit 22 (Step S44). Next, the analysis core 20 increments the number k of the fetch address by one (Step S47). After that, the semiconductor device 1 according to the first embodiment repeats the processing from Step S42 to Step S44 until the number k of the fetch address reaches the last number m (Step S45).

In the second example, the processing from Step S41 to Step S47 is repeated until the number k of the CPU core reaches n while incrementing the number i of the CPU core one by one (Steps S47 and S48).

When all of the arithmetic results AD1 to ADn acquired by executing the program steps specified by the fetch addresses FA(k) to FA(m) in the CPU cores 101 to 10n (CPU cores (1) to (n) in FIG. 9) are acquired, the analysis core 20 generates the analysis information based on the arithmetic results AD1 to ADn (Step S49). After that, the analysis core 20 ends the analysis information acquisition processing.

As described so far, in the analysis mode, the semiconductor device 1 according to the first embodiment causes a plurality of CPU cores to execute one user program and acquires the information on a difference between two arithmetic results generated by the two CPU cores based on one user program as the analysis information. For example, in the analysis mode, an analysis using combinations of a core and a program including a combination of a defective CPU core and a user program can produce the analysis information that enables clear evaluation of the defective part as the difference information.

In the semiconductor device 1 according to the first embodiment, the analysis processing based on the user program in the analysis mode eliminates the need for a person in charge of analysis to create the core analysis program for identifying an analyzed part by himself/herself. Thus, the analysis using the semiconductor device 1 according to the first embodiment can reduce the time needed to create the core analysis program. Further, the analysis using the semiconductor device 1 according to the first embodiment can perform the analysis processing with high defect reproducibility using the user program. The test escape is likely to have a defect occurring at a part where it is not initially expected to occur. For this reason, it is extremely difficult to identify a defective part in a test escape, and it takes a huge amount of time to create a program for identifying the defect. Further, it cannot be said that defect reproducibility is necessarily high. Thus, the reduction in the analysis time and high defect reproducibility based on the analysis mode of the semiconductor device 1 according to the first embodiment are highly effective.

In the semiconductor device 1 according to the first embodiment, it is not necessary to prepare a non-defective sample to be compared with the test escape. Additionally, in the semiconductor device 1 according to the first embodiment, the operation in the analysis mode can be completed only by the processing inside the semiconductor device. This facilitates reproducing of a defect occurring due to an operation speed of the semiconductor device.

The semiconductor device 1 according to the first embodiment has the debugging mode in which at least one of the CPU cores 101 to 10n executes the core analysis program AP stored in the analysis program storage unit 22. It is possible to create a core analysis program AP for detecting a defective part identified in the analysis mode and verify the quality of the core analysis program AP in the debugging mode.

The semiconductor device 1 according to the first embodiment can also analyze the CPU core using the operation in the debugging mode. In this case, the core analysis program AP is used as a program to be executed in the analysis mode. That is, in the semiconductor device 1 according to the first embodiment, the types of programs that can be used for the analysis of the CPU core are diverse. The core analysis program AP created by an analyst can reproduce a defect that cannot be reproduced by executing the user program.

Second Embodiment

Figure 10:
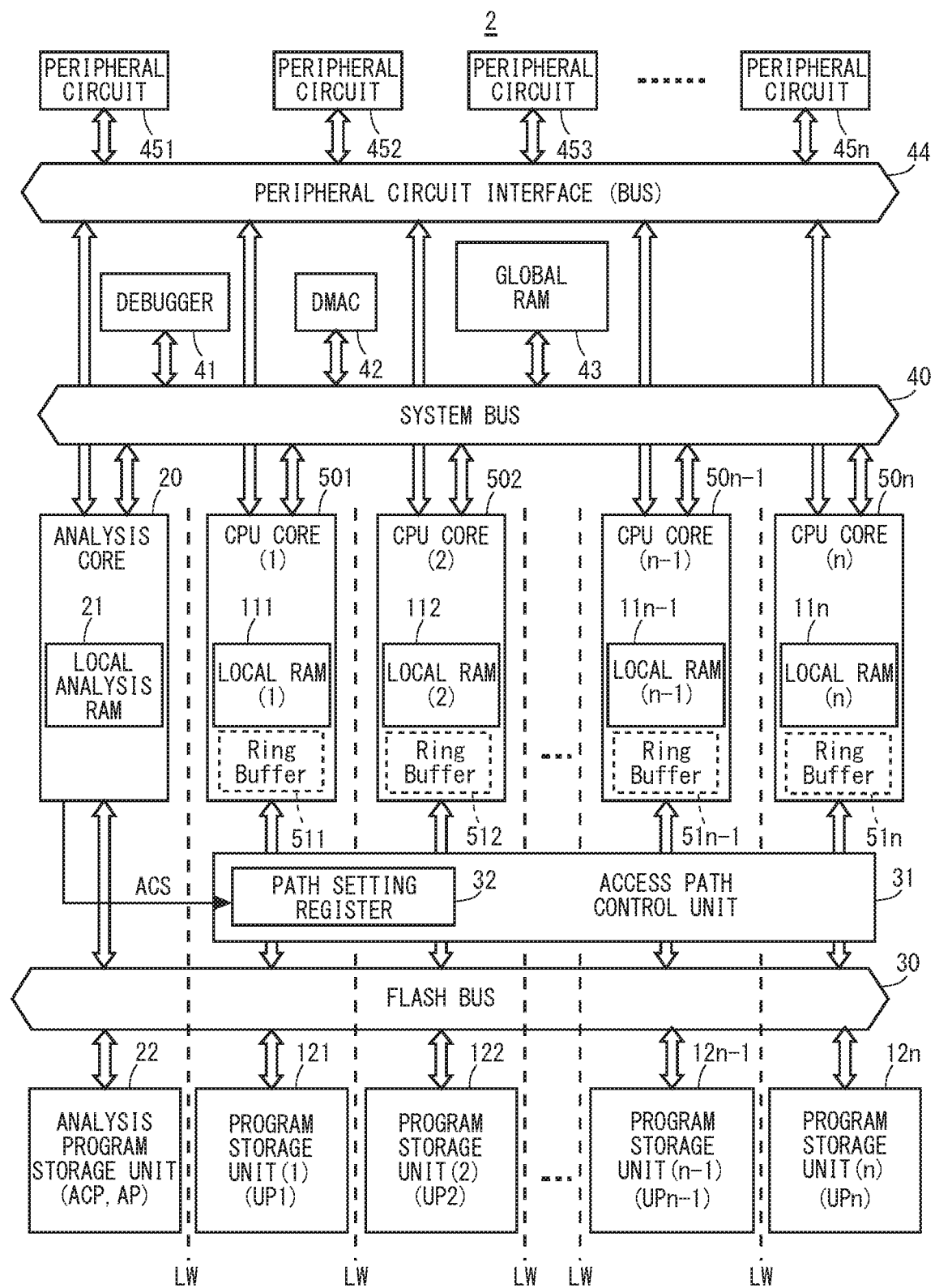
FIG. 10 is a block diagram of a semiconductor device according to a second embodiment.

In a second embodiment, a semiconductor device 2, which is a modified example of the semiconductor device 1 according to the first embodiment, will be described. FIG. 10 is a block diagram of the semiconductor device 2 according to the second embodiment. In the description of the second embodiment, the same reference signs as those in the first embodiment denote the same components as those described in the first embodiment, and descriptions thereof will be omitted.

Figure 11:
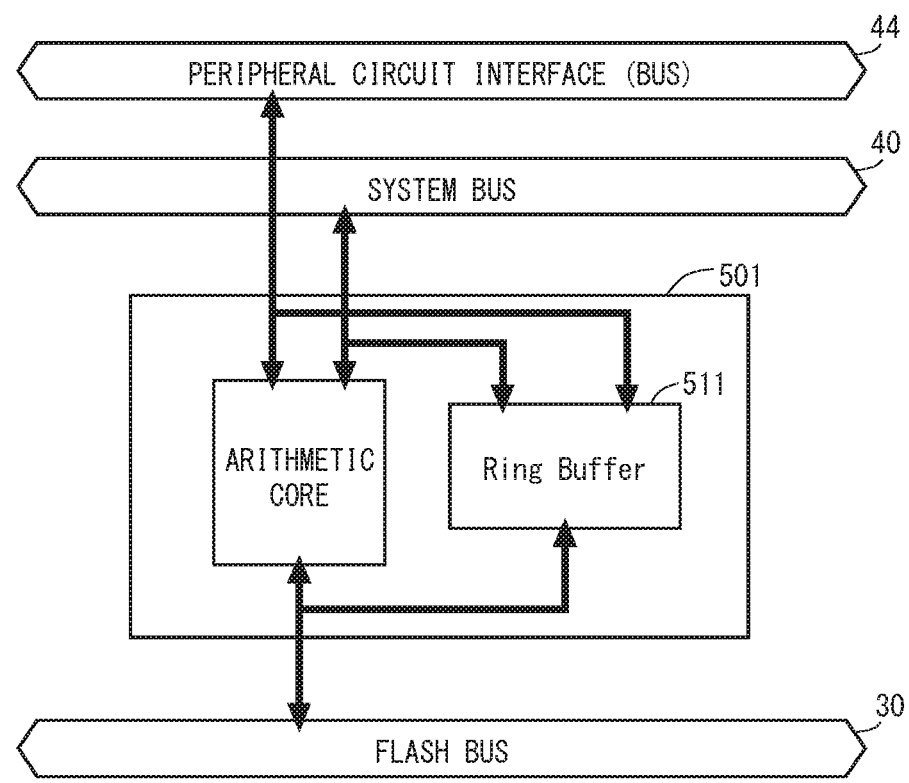
FIG. 11 is a block diagram describing a relationship between an arithmetic core and a ring buffer in the semiconductor device according to the second embodiment.

As shown in FIG. 10, the semiconductor device 2 according to the second embodiment includes CPU cores 501 to 50n instead of the CPU cores 101 to 10n. The configuration of the CPU cores 501 to 50n are the same as those of the CPU cores 101 to 10n except that the CPU cores 501 to 50n further include ring buffers 511 to 51n, respectively. FIG. 11 is a block diagram describing the relationship between the arithmetic core and the ring buffer in the semiconductor device according to the second embodiment. As all of the ring buffers 511 to 51n are the same, only the ring buffer 511 is shown in FIG. 11.

As shown in FIG. 11, the ring buffer 511 is provided in such a way that it is connected in parallel to the arithmetic core that executes the operation command included in the program inside the CPU core 501. The ring buffer 511 monitors signals including an address signal and a data signal output from the arithmetic core to the flash bus 30, the system bus 40, and the peripheral circuit interface 44, acquires signals input to and output from the ring buffer 511 in chronological order, and holds them as operation monitor information. An example of the signals monitored by the ring buffer 511 will be described with reference to FIG. 12.

Figure 12:
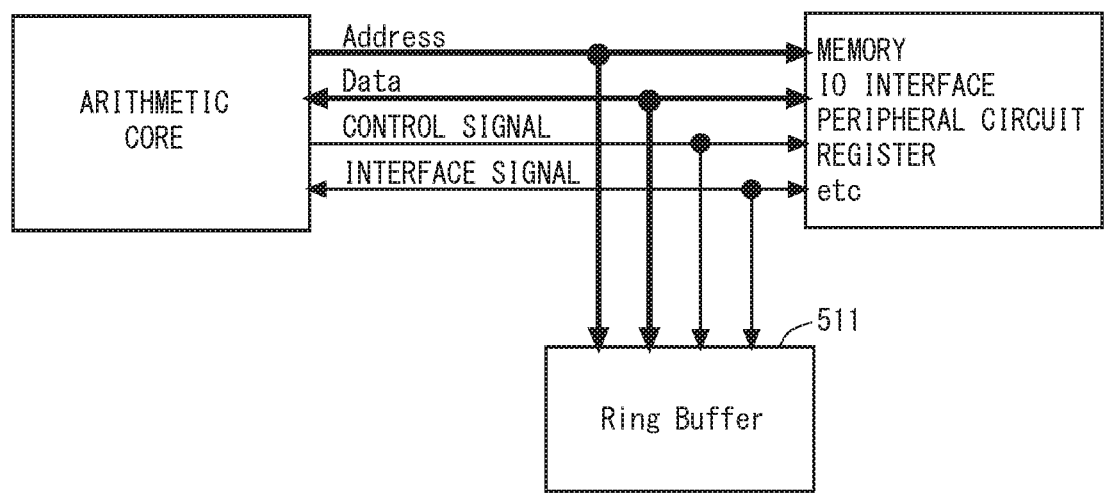
FIG. 12 is a block diagram describing information acquired by the ring buffer of the semiconductor device according to the second embodiment.

FIG. 12 is a block diagram describing information acquired by the ring buffer of the semiconductor device according to the second embodiment. As shown in FIG. 12, when the arithmetic core accesses a memory (a global RAM, a program storage area), a peripheral circuit, an IC interface, a register of another processing block, etc., it outputs an address signal, a data signal, a control signal (a read command, a write command, etc.), an interface signal (a chip select signal, an acknowledge signal, etc.). The ring buffer 511 acquires the signals used by such an arithmetic core to access other circuit blocks in chronological order as the operation monitor information. In the semiconductor device 2 according to the second embodiment, the operation monitor information acquired by the ring buffer is included in the arithmetic result AD generated by each CPU core.

From the above description, it can be seen that in the semiconductor device 2 according to the second embodiment, the arithmetic result includes not only the arithmetic result AD finally acquired by executing the program but also the chronological information of the signals used by the CPU core to access other circuits. The operation state of the semiconductor device is verified based on the analysis information generated by the semiconductor device 2 according to the second embodiment. This achieves more detailed verification than the verification of the operation state of the semiconductor device based on the analysis information generated by the semiconductor device 1 according to the first embodiment. Specifically, when the cause of a defect in the CPU core is an error in an address value generated in the access to the peripheral circuit, the cause will be known through the verification based on the analysis information generated by the semiconductor device 2 according to the second embodiment and not through the analysis information generated by the semiconductor device 1 according to the first embodiment.

Third Embodiment

Figure 13:
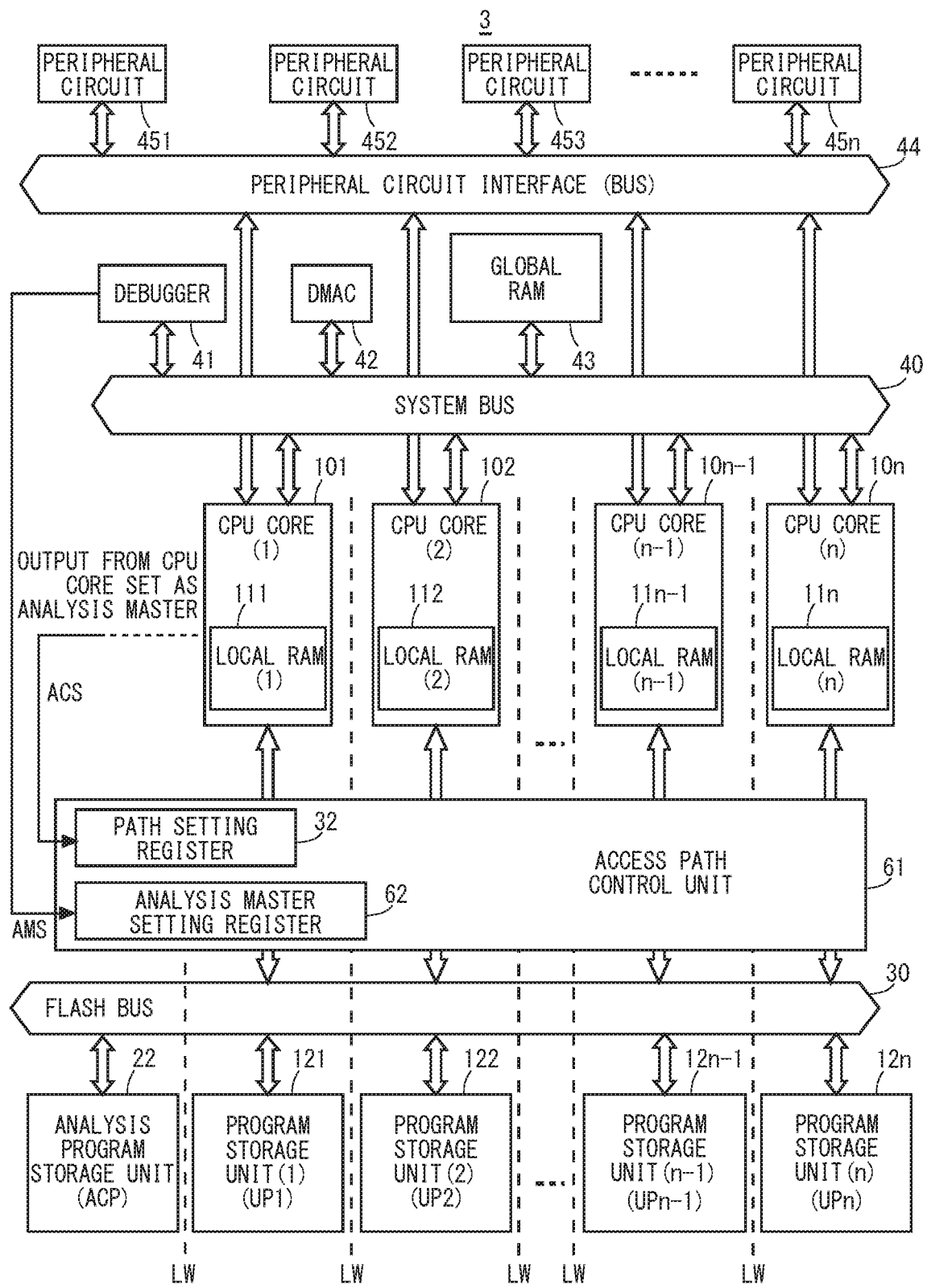
FIG. 13 is a block diagram of a semiconductor device according to a third embodiment.

In a third embodiment, a semiconductor device 3, which is a modified example of the semiconductor device 1 according to the first embodiment, will be described. FIG. 13 is a block diagram of the semiconductor device 3 according to the third embodiment. In the description of the third embodiment, the same reference signs as those in the first embodiment denote the same components as those described in the first embodiment, and descriptions thereof will be omitted.

As shown in FIG. 13, in the semiconductor device 3 according to the third embodiment, the analysis core 20 of the semiconductor device 1 according to the first embodiment is removed. In the third embodiment, any one of the CPU cores 101 to 10n is used as an analysis master that serves the same function as the analysis core in the analysis mode or the debugging mode.

In the semiconductor device 3 according to the third embodiment, the access path control unit 31 of the semiconductor device 1 according to the first embodiment is replaced by the access path control unit 61. The configuration of the access path control unit 61 is the same as that of the access path control unit 31 except that the access path control unit 61 further includes an analysis master setting register 62. The access path control unit 61 forms a path for the CPU core specified as the analysis master to access the analysis program storage unit 22 based on an analysis master setting value AMS provided from the debugger 41.

Specifically, when the semiconductor device 3 according to the third embodiment operates in the analysis mode or the debugging mode, the debugger 41 provides the analysis master setting value AMS to the analysis master setting register 62, and forms access paths from the CPU core specified as the analysis master to the analysis program storage unit 22. After that, in the semiconductor device 3 according to the third embodiment, the debugger 41 provides the analysis mode start command or the debugging mode start command to the CPU core serving as the analysis master, and switches the CPU core that has received the mode start command to the analysis master. After such processing, the semiconductor device 3 according to the third embodiment performs the same analysis processing or debugging processing as in the first embodiment. Note that it is preferable that the CPU core used as the analysis master be a CPU core with no defect occurring therein.

Figure 14:
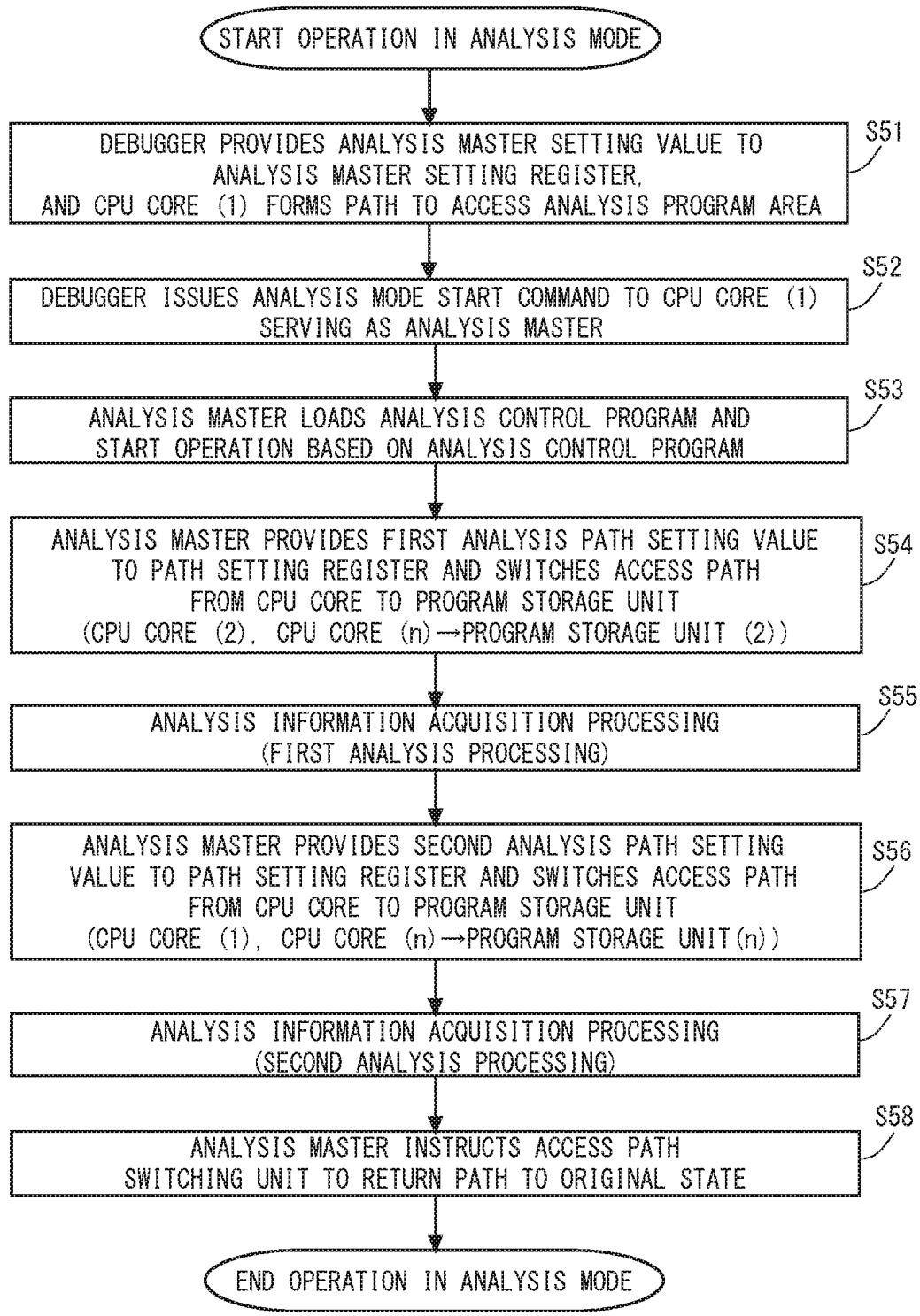
FIG. 14 is a flowchart for describing a processing flow of an analysis mode of the semiconductor device according to the third embodiment.

FIG. 14 is a flowchart for describing a processing flow of the analysis mode of the semiconductor device according to the third embodiment. In an example shown in FIG. 14, the CPU core 101 is used as the analysis master.

As shown in FIG. 14, in the semiconductor device 3 according to the third embodiment, firstly, the debugger 41 provides the analysis master setting value AMS to the analysis master setting register 62, and forms access paths from the CPU core 101 specified as the analysis master to the analysis program storage unit 22 (Step S51). Next, in the semiconductor device according to the third embodiment, the debugger 41 issues the analysis mode start command to the CPU core serving as the analysis master, and switches the CPU core that has received the analysis mode start command to the analysis master (Step S52). In Steps S53 to S58 after Step S52, the processing in Steps S2 to S7 of the first embodiment described with reference to FIG. 2 is performed using the CPU core 102 and the CPU core 10n.

Figure 15:
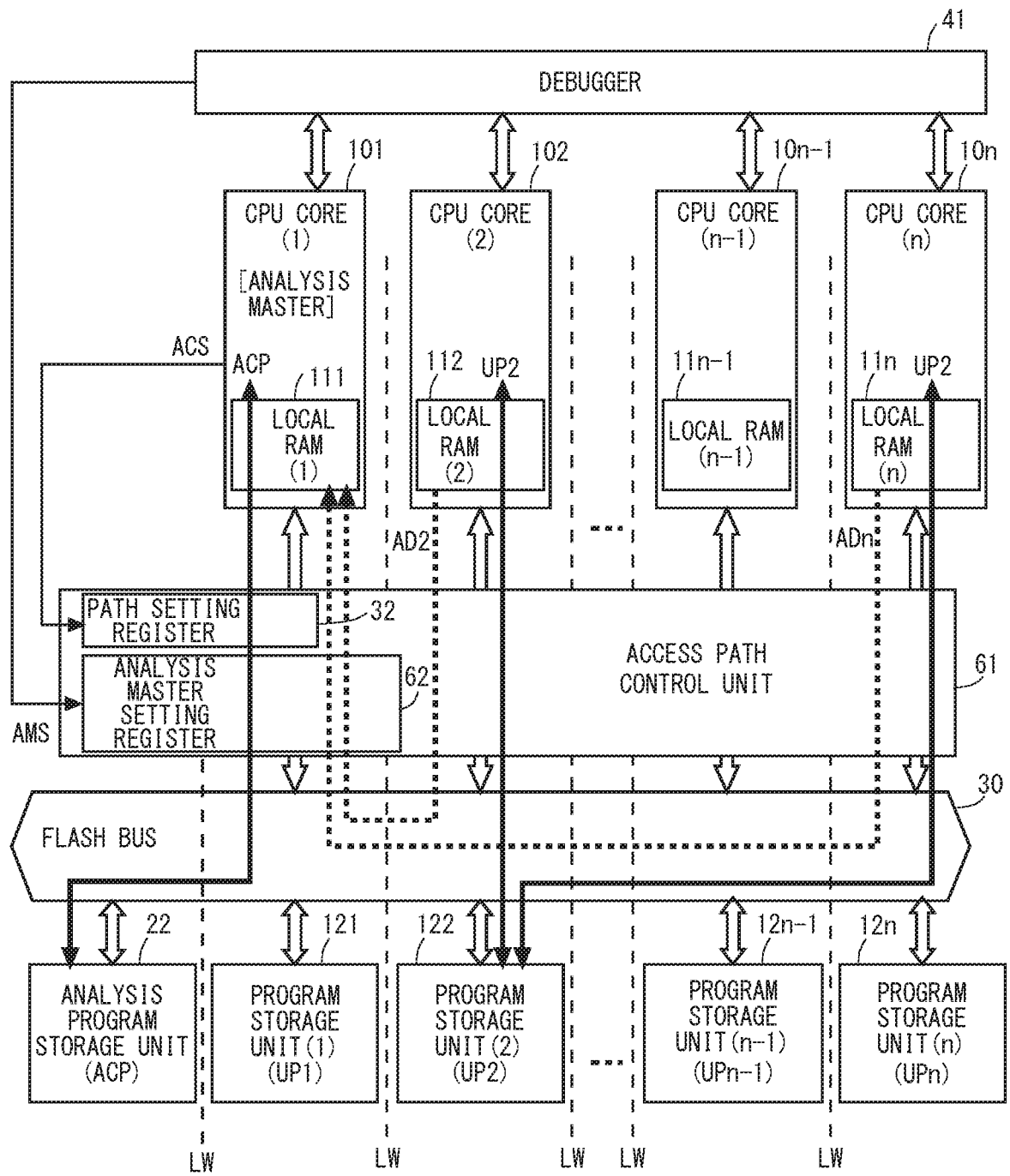
FIG. 15 is a diagram describing read paths of programs and read paths of arithmetic results in first analysis processing of the analysis mode of the semiconductor device according to a third embodiment.

FIG. 15 is a diagram for describing read paths of the programs and read paths of the arithmetic results in the first analysis processing of the analysis mode of the semiconductor device 3 according to the third embodiment. As shown in FIG. 15, in the semiconductor device 3 according to the third embodiment, the CPU core 101 is used as the analysis master, and the analysis processing is performed using the CPU cores 102 and 10n. In this case, the analysis control program ACP is read into the CPU core 101, and the user program UP2 is read into the CPU cores 102 and 10n.

The arithmetic results AD2 and ADn generated by the CPU cores 102 and 10n, respectively, are collected in the local RAM 111 of the CPU core 101.

In the above description, the case where the semiconductor device 3 according to the third embodiment operates in the analysis mode has been described. However, execution in Steps S51 and S52 for specifying the analysis master serving as the analysis core enables the semiconductor device 3 according to the third embodiment to operate in the debugging mode.

As described above, in the semiconductor device 3 according to the third embodiment, a separate analysis core is not provided and instead one of the plurality of CPU cores is specified as the analysis master serving the same function as that of the analysis core when the semiconductor device 3 operates in the analysis mode or the debugging mode. This enables the semiconductor device 3 according to the third embodiment to reduce a circuit area, in which the analysis core is provided, and thereby reducing a chip area. The analysis core has a circuit size equivalent to that of the CPU core. Thus, the reduction in the circuit area required for the analysis core is remarkably effective.

Fourth Embodiment

Figure 16:
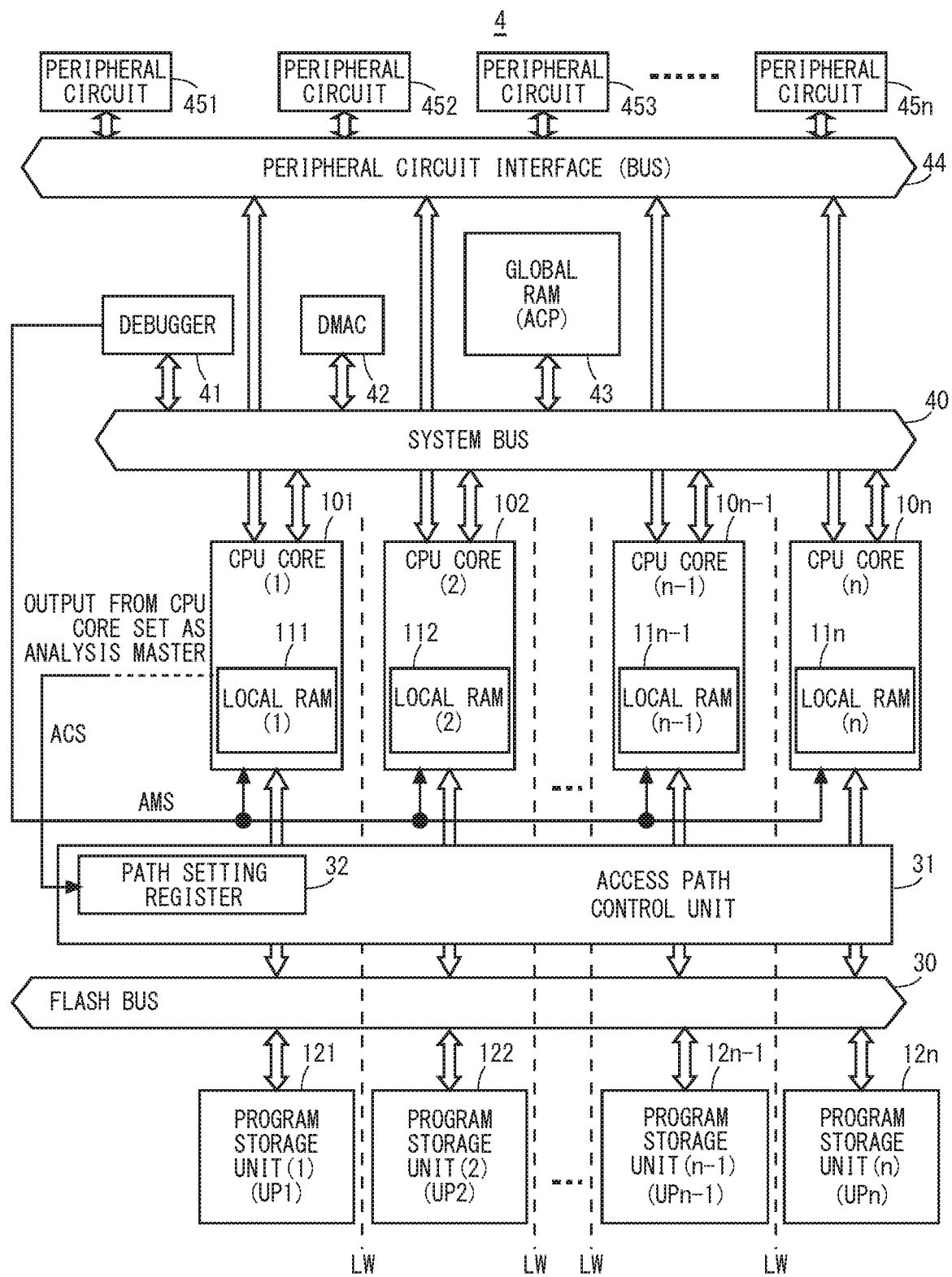
FIG. 16 is a block diagram of a semiconductor device according to a fourth embodiment.

In a fourth embodiment, a semiconductor device 4, which is a modified example of the semiconductor device 3 according to the third embodiment, will be described. FIG. 16 is a block diagram of the semiconductor device 4 according to the fourth embodiment. In the description of the fourth embodiment, the same reference signs are provided to the same components as those in the first and third embodiments, and descriptions thereof will be omitted.

As shown in FIG. 16, in the semiconductor device 4 according to the fourth embodiment, the analysis program storage unit 22 of the semiconductor device 3 according to the third embodiment is removed. Further, in the semiconductor device 4 according to the fourth embodiment, the access path control unit 31 is used instead of the access path control unit 63. That is, the semiconductor device 4 according to the fourth embodiment can also be regarded as the semiconductor device 1 according to the first embodiment with the analysis core 20 and the analysis program storage unit 22 being removed.

In the semiconductor device 4 according to the fourth embodiment, the analysis control program ACP is stored in the global RAM 43. That is, in the semiconductor device 4 according to the fourth embodiment, a global memory area (the global RAM 43), which is one of the peripheral circuits accessible from any of the CPU cores 101 to 10n, is used as the analysis local memory area (e.g., the analysis program storage unit 22).

In the semiconductor device 4 according to the fourth embodiment, a third arithmetic core (e.g., CPU core) instructed by the debugger 41 to function as an analysis master loads the analysis control program ACP from the global RAM 43 based on the analysis master setting value AMS provided from the debugger 41 to thereby function as the analysis core.

Figure 17:
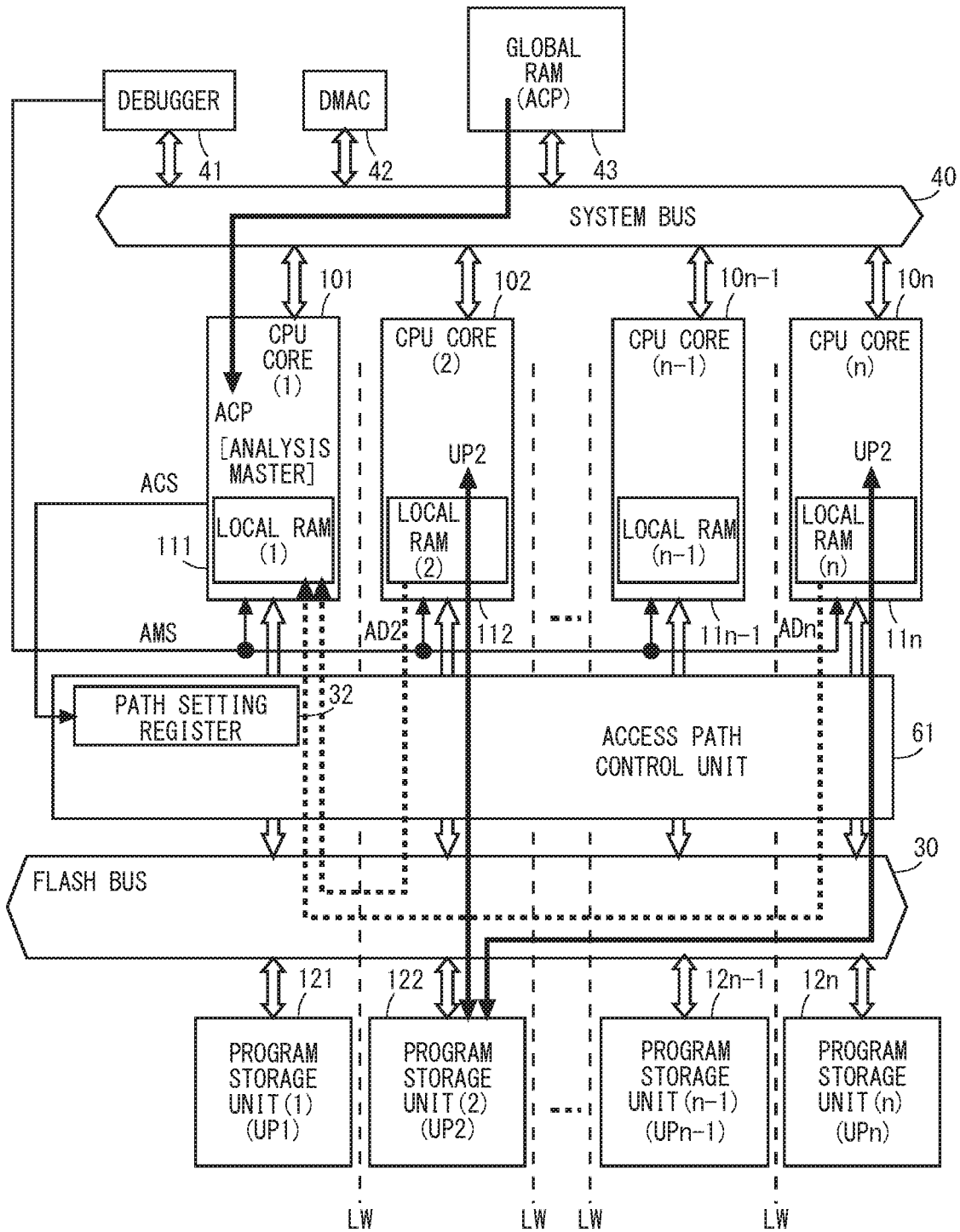
FIG. 17 is a diagram describing read paths of programs and read paths of arithmetic results in first analysis processing of an analysis mode of the semiconductor device according to the fourth embodiment.

FIG. 17 is a diagram for describing read paths of the programs and read paths of the arithmetic results in the first analysis processing of the analysis mode of the semiconductor device 4 according to the fourth embodiment. As shown in FIG. 17, in the semiconductor device 4 according to the fourth embodiment, the CPU core 101 is used as the analysis master, and the analysis processing is performed using the CPU cores 102 and 10n. In this case, the analysis control program ACP is read from the global RAM 43 into the CPU core 101, and the user program UP2 is read into the CPU cores 102 and 10n. The arithmetic results AD2 and ADn generated by the CPU cores 102 and 10n, respectively, are collected in the local RAM 111 of the CPU core 101.

Note that that not only the analysis control program ACP but also the core analysis program AP can be stored in the global RAM 43. Preferably, a host computer connected outside stores the analysis control program ACP and the core analysis program AP in the global RAM 43 at the time of an analysis or debugging. Storing the analysis control program ACP and the core analysis program AP in the global RAM 43 only when necessary can increase an available capacity of the global RAM 43 when the semiconductor device is actually used.

From the above description, it can be seen that the semiconductor device 4 according to the fourth embodiment can perform the analysis processing or debug processing similar to those of the semiconductor device 1 according to the first embodiment without the analysis core 20 and the analysis program storage unit 22. Thus, the semiconductor device 4 according to the fourth embodiment can further reduce the chip area as compared with the semiconductor device 3 according to the third embodiment.

Fifth Embodiment

Figure 18:
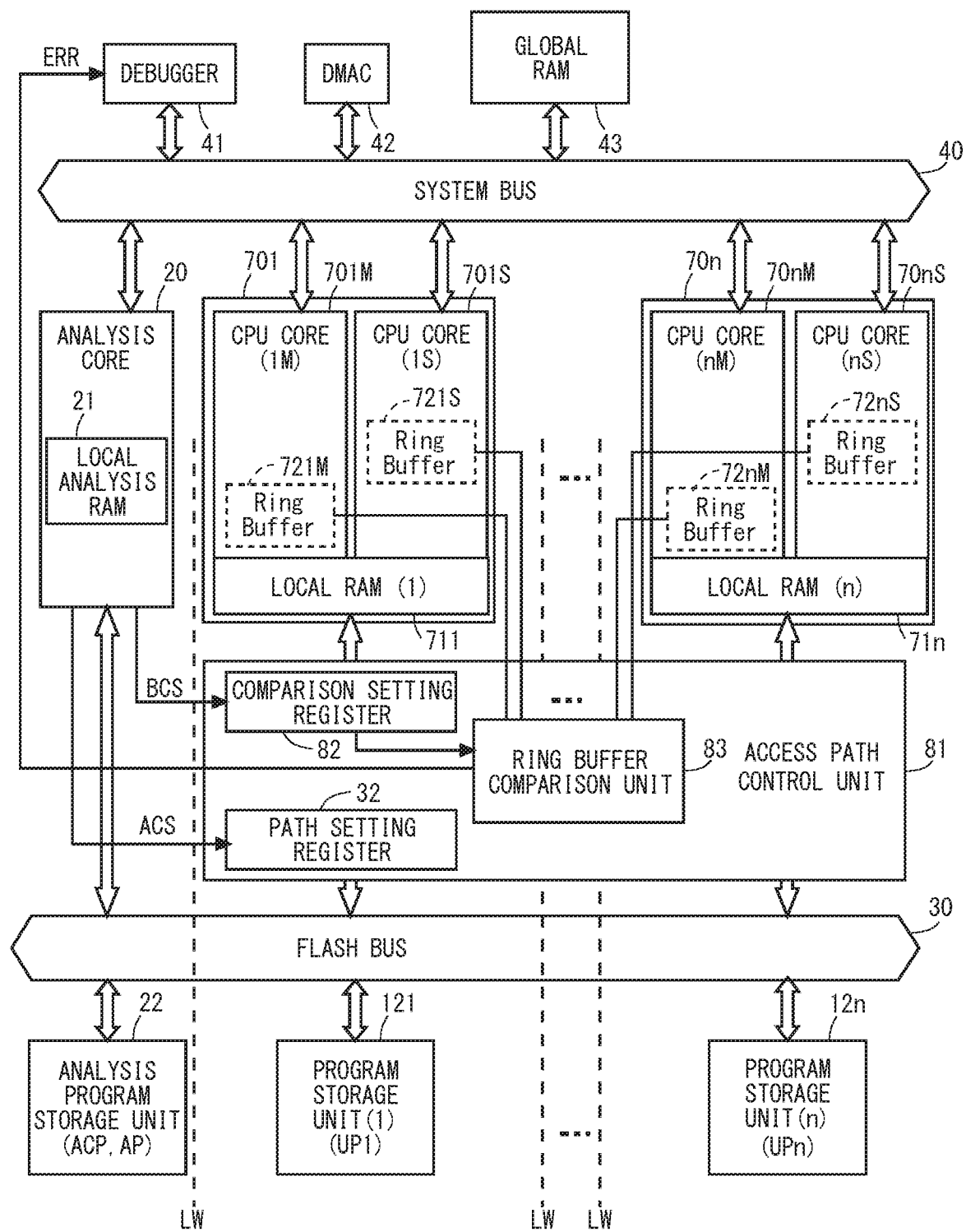
FIG. 18 is a block diagram of a semiconductor device according to a fifth embodiment.

In a fifth embodiment, a semiconductor device 5, which is a modified example of the semiconductor device 1 according to the first embodiment, will be described. FIG. 18 is a block diagram of the semiconductor device 5 according to the fifth embodiment. In the description of the fifth embodiment, the same reference signs as those in the first embodiment denote the same components as those described in the first embodiment, and descriptions thereof will be omitted.

As shown in FIG. 18, the semiconductor device 5 according to the fifth embodiment includes CPU cores 701 to 70n instead of the CPU cores 101 to 10n. Further, the semiconductor device 5 according to the fifth embodiment includes an access control unit 81 instead of the access path control unit 31.

Each of the CPU cores 701 to 70n includes a master CPU core (a CPU core with M at the end of the reference sign) and a slave CPU core (a CPU core with S at the end of the reference sign). The master CPU core and the slave CPU core have the same circuit configuration. Ring buffers (721M to 72nM and 721S to 72nS in FIG. 18) are provided in the master CPU core and the slave CPU core, respectively. Each CPU core includes a local RAM (711 to 71n in FIG. 18) commonly used by the master CPU core and the slave CPU core. The ring buffers 721M to 72nM and 721S to 72nS are the same as the ring buffers 511 to 51n described in the second embodiment.

The master CPU core and the slave CPU core perform a lock step operation in which they execute the same program step at the same clock timing. In this lock step operation, two CPU cores execute one program in an overlapped manner. In the semiconductor device 5 according to the fifth embodiment, a ring buffer comparison unit 83, which will be described later, compares output values of the ring buffers belonging to one CPU core. When there is a difference in the output values of the two ring buffers, the buffer comparison unit 83 determines that a defect has occurred in either the master CPU core or the slave CPU core, and outputs the error signal ERR.

A configuration of the access control unit 81 is the same as that of the access path control unit 31 of the semiconductor device 1 according to the first embodiment except that the access control unit 81 further includes a comparison setting register 82 and a ring buffer comparison unit 83. The comparison setting register 82 stores a buffer comparison setting value BCS specifying a combination of the output values of the ring buffers to be compared by the ring buffer comparison unit 83. The ring buffer comparison unit 83 compares the output values of the ring buffers according to the combination specified based on the buffer comparison setting value BCS and outputs an error signal ERR when there is a mismatch in the output values.

The buffer comparison setting value BCS is rewritten when the analysis core 20 executes the analysis control program ACP. Specifically, in the normal operation mode, the analysis core 20 sets the buffer comparison setting value BCS so that the output values of the ring buffers provided inside one CPU core are compared (i.e., the output value of the ring buffer of the master CPU core is compared with the output value of the slave CPU core).

In the analysis mode or the debugging mode, the analysis core 20 rewrites the buffer comparison setting value BCS so that the output values of the ring buffers belonging to different CPU cores are compared. Then, at the end of the analysis mode, the analysis core 20 writes back the buffer comparison setting value BCS so that the output values of the ring buffers belonging to the same CPU core are compared.

In the semiconductor device 5 according to the fifth embodiment, when the debugger 41 receives the error signal ERR output from the ring buffer comparison unit 83 in the normal operation mode, the analysis core 20 is instructed to start the operation in the analysis mode.

Figure 19:
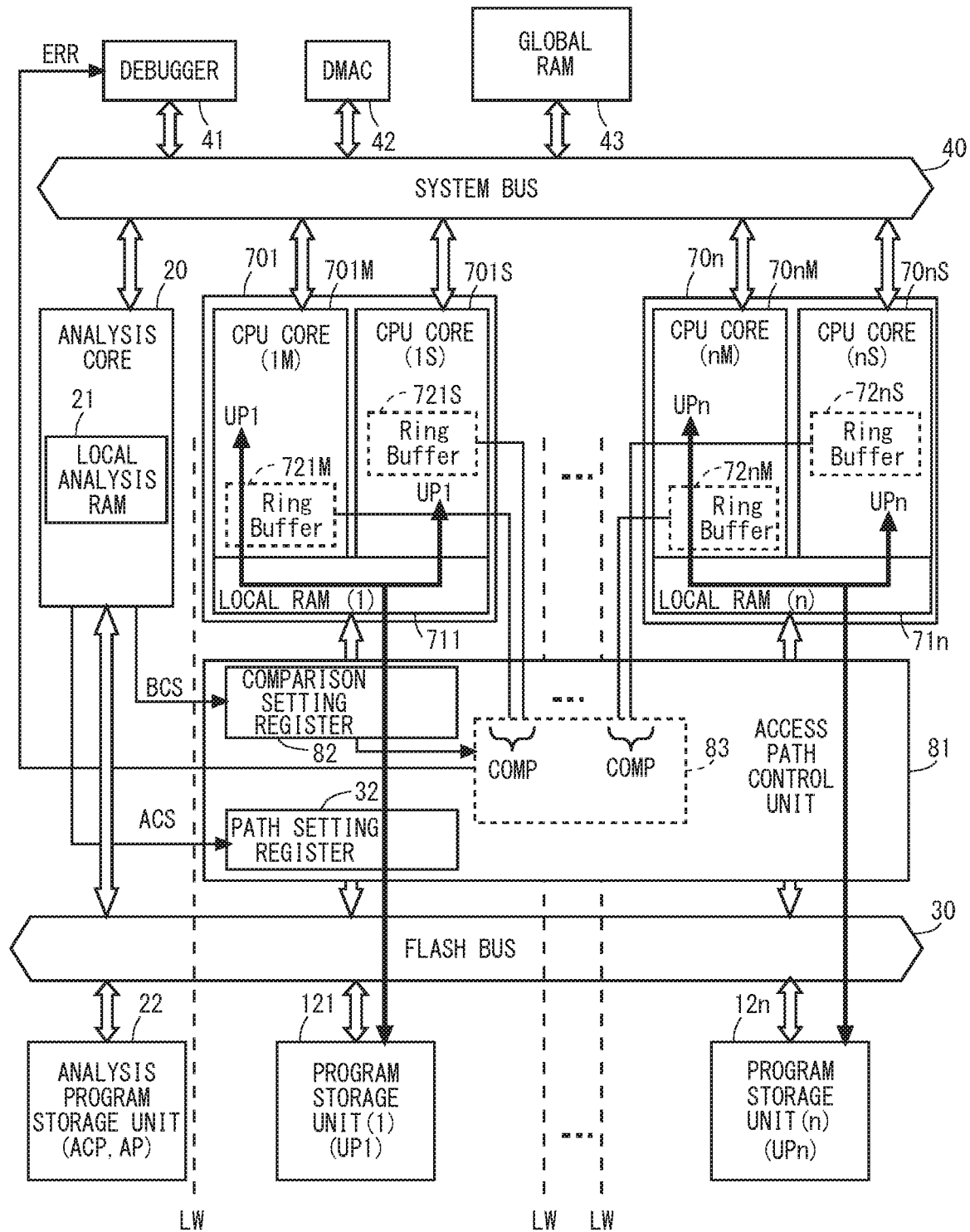
FIG. 19 is a diagram describing read paths of programs and read paths of arithmetic results in a normal operation mode of the semiconductor device according to the fifth embodiment.

FIG. 19 is a diagram for describing read paths of the programs and read paths of the arithmetic results in the normal operation mode of the semiconductor device according to the fifth embodiment. As shown in FIG. 19, in the normal operation mode of the semiconductor device 5 according to the fifth embodiment, each CPU core loads the user program stored in the program storage unit allocated to the corresponding CPU core as the occupied memory area, and the user program is executed by the lock step operation performed by the master CPU core and the slave CPU core. In the normal operation mode, the semiconductor device 5 according to the fifth embodiment compares the output values of the plurality of ring buffers belonging to one CPU core and then outputs the error signal ERR.

Figure 20:
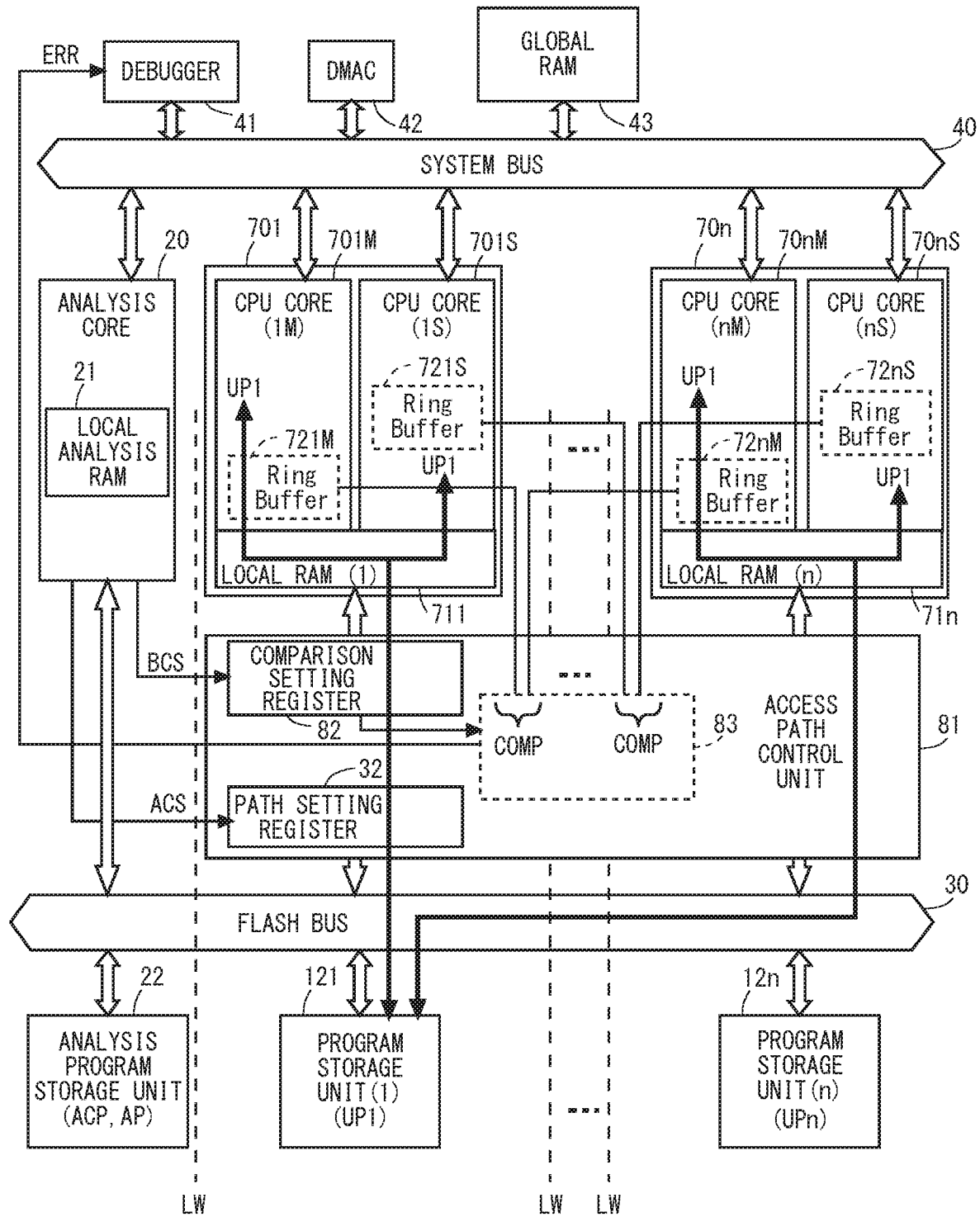
FIG. 20 is a diagram describing read paths of programs and read paths of arithmetic results in first analysis processing of an analysis mode of the semiconductor device according to the fifth embodiment.

FIG. 20 is a diagram for describing the read paths of the programs and read paths of the arithmetic results in the first analysis processing of the analysis mode of the semiconductor device according to the fifth embodiment. As shown in FIG. 19, in the first analysis processing of the analysis mode, in the semiconductor device 5 according to the fifth embodiment, the CPU cores 70 1 and 70n load the user program UP1 stored in the program storage unit 121 allocated to the CPU core 101 as the occupied memory area, and executes the user program UP1 by the lock step operation performed by the master CPU core and the slave CPU core. In the first analysis processing of the analysis mode, the semiconductor device 5 according to the fifth embodiment compares the output values of the plurality of ring buffers belonging to different CPU cores and then outputs the error signal ERR. In the example shown in FIG. 19, the ring buffer comparison unit 83 compares the output value of the ring buffer 721M belonging to the CPU core 70 1 with the output value of the ring buffer 72nMn belonging to the CPU core 70n, and compares the output value of the ring buffer 721S belonging to the CPU core 70 1 with the output value of the ring buffer 72nS belonging to the CPU core 70n.

As described above, the semiconductor device 5 according to the fifth embodiment compares the output values of the ring buffers respectively provided for the master CPU core and the slave CPU core that perform the lock step operation in order to detect a defect occurring in the CPU core. In the analysis mode, the output values of the ring buffers belonging to different CPU cores are compared to detect a defect. In this analysis mode, the comparison processing is performed a plurality of times while changing the combinations of the output values of the ring buffers to be compared. This enables identification of a CPU core in which a defect is occurring.

Although the present disclosure made by the present inventor has been described in detail based on the embodiments, it is obvious that the present disclosure is not limited to the above embodiments, and various modifications can be made without departing from the scope of the disclosure.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first to fifth embodiments can be combined as desirable by one of ordinary skill in the art.

What is claimed is:

1. A semiconductor device comprising:
a first arithmetic core configured to execute a first program stored in a first code area using a first local memory area;
a second arithmetic core configured to execute a second program stored in a second code area different from the first code area using a second local memory area;
an analysis code area configured to store an analysis control program;
an analysis local memory area configured to hold an execution result of the analysis control program;
an analysis core configured to control a program execution state of the first arithmetic core or the second arithmetic core based on the analysis control program in an analysis mode in which a defect in the first arithmetic core and the second arithmetic core is analyzed; and
an access path control unit configured to, in a normal operation mode in which the first arithmetic core and the second arithmetic core independently operate, prevent the first arithmetic core from accessing the second code area and the second arithmetic core from accessing the first code area, wherein
in the analysis mode, the access path control unit switches an access path so that the first program is read into the first arithmetic core and the second arithmetic core in accordance with a command from the analysis core in first analysis processing and switches the access path so that the second program is read into the first arithmetic core and the second arithmetic core in second analysis processing, and
the analysis core compares, in the first analysis processing, first arithmetic result data generated by the first arithmetic core based on the first program with second arithmetic result data generated by the second arithmetic core based on the first program and, in the second analysis processing, compares third arithmetic result data generated by the first arithmetic core based on the second program with fourth arithmetic result data generated by the second arithmetic core based on the second program in order to generate analysis information used for analyzing the defect in the first arithmetic core, the second arithmetic core, and circuits used by the first arithmetic core and the second arithmetic core.

2. The semiconductor device according to claim 1, wherein
the analysis code area stores a core analysis program that executes a specific test sequence on the first arithmetic core and the second arithmetic core, and
in a debugging mode, the analysis core causes the first arithmetic core and the second arithmetic core to execute the core analysis program and generates the analysis information based on fifth arithmetic result data generated based on the core analysis program.

3. The semiconductor device according to claim 1, wherein the access path control unit comprises a path setting register that holds a path setting value provided by the analysis core and switches a code area to be an access destination of the first arithmetic core and the second arithmetic core based on the path setting value.

4. The semiconductor device according to claim 1, further comprising a debugger configured to instruct the analysis core to start an operation based on the analysis control program.

5. The semiconductor device according to claim 1, further comprising a plurality of peripheral circuits connected to the first arithmetic core and the second arithmetic core via a bus, wherein the first arithmetic core and the second arithmetic core execute the first program or the second program using at least one of the plurality of peripheral circuits in the analysis mode.

6. The semiconductor device according to claim 5, wherein the plurality of peripheral circuits include at least one of a timer, an analog-to-digital conversion circuit, a coprocessor, a memory, a direct memory access controller, a PWM signal generation circuit, a communication interface circuit, and an input and output interface circuit.

7. The semiconductor device according to claim 1, wherein
each of the first arithmetic core and the second arithmetic core comprises a ring buffer,
the ring buffer acquires signals input to and output from the first arithmetic core and the second arithmetic core in chronological order and holds them as operation monitor information, and
the first arithmetic result data to the fourth arithmetic result data include the operation monitor information held in the ring buffer.

8. The semiconductor device according to claim 1, further comprising:
a third arithmetic core configured to execute a third program stored in a third code area different from the first code area and the second code area using a third local memory area; and
a debugger configured to instruct the first arithmetic core to the third arithmetic core to perform or not to perform an operation based on the analysis mode, wherein the third arithmetic core operates as the analysis core in accordance with the command from the debugger in the analysis mode.

9. The semiconductor device according to claim 8, wherein the access path control unit comprises an analysis master setting register for holding an analysis master setting value provided from the debugger and switches a code area of an access destination of the third arithmetic core to the analysis code area based on the analysis master setting value.

10. The semiconductor device according to claim 8, wherein
the analysis local memory area is a global memory area, which is one of peripheral circuits accessible from the first arithmetic core, the second arithmetic core, and the third arithmetic core, and
the third arithmetic core loads the analysis control program from the global memory area based on the analysis master setting value provided from the debugger in order to function as the analysis core.

11. The semiconductor device according to claim 1, wherein
each of the first arithmetic core and the second arithmetic core comprises:
a master core and a slave core having the same circuit configuration;
a plurality of ring buffers provided to respectively correspond to each of the master core and the slave core;
a local memory area shared by the first arithmetic core and the second arithmetic core;
a comparison setting register configured to store a buffer comparison setting value specifying a combination of output values of the ring buffers to be compared; and
a ring buffer comparison unit configured to compare the output values of the ring buffers according to the combination of the output values of the ring buffers specified based on the buffer comparison setting value and output an error signal when there is a mismatch between the output values,
in the analysis mode, the analysis core rewrites the buffer comparison setting value so that the output values of the ring buffers belonging to different arithmetic cores are compared, and
at the end of the analysis mode, the analysis core writes back the buffer comparison setting value so that the output values of the ring buffers belonging to the same arithmetic core are compared.

12. The semiconductor device according to claim 11, further comprising a debugger configured to, in the normal operation mode, instruct the analysis core to start an operation in the analysis mode based on the error signal output from the ring buffer comparison unit.

* * * * *